US005354411A

United States Patent [19]

Lines

[11] Patent Number: 5,354,411

[45] Date of Patent: Oct. 11, 1994

[54] METHOD AND APPARATUS FOR MANUFACTURE OF WOODEN I-BEAMS

[75] Inventor: Jerry L. Lines, Tacoma, Wash.

[73] Assignee: Globe Machine Manufacturing Company, Tacoma, Wash.

[21] Appl. No.: 84,454

[22] Filed: Jul. 1, 1993

Related U.S. Application Data

[63] Continuation of Ser. No. 645,450, Jan. 24, 1991, abandoned.

[51] Int. Cl.[5] .......... B32B 31/00

[52] U.S. Cl. .......... 156/556; 156/499; 156/516; 156/519; 156/552; 156/557; 156/558; 156/559; 198/408; 198/463.4; 198/481.1

[58] Field of Search .......... 156/64, 362, 364, 516, 156/519, 552, 556, 557, 558, 559, 499; 198/463.4, 408, 481.1

[56] References Cited

U.S. PATENT DOCUMENTS

| | | | |
|---|---|---|---|
| 1,150,302 | 8/1915 | Perkins et al. | 198/463.4 |
| 1,631,150 | 6/1927 | Owen | 198/481.1 |
| 2,941,655 | 6/1960 | Wells | 198/408 |
| 3,039,588 | 6/1962 | Harnack | 198/463.4 |
| 3,092,513 | 6/1963 | Browning | 118/212 |
| 3,194,380 | 7/1965 | Watson | 156/499 |
| 3,209,890 | 10/1965 | Miles | 198/463.4 |
| 3,490,188 | 1/1970 | Troutner | 52/644 |
| 3,494,455 | 2/1970 | Sarring | 198/408 |
| 3,616,091 | 10/1971 | Troutner | 156/560 |
| 3,894,908 | 7/1975 | Troutner et al. | 156/258 |
| 3,917,503 | 11/1975 | Tamura et al. | 156/499 |
| 4,074,498 | 2/1978 | Keller et al. | 52/690 |
| 4,123,315 | 10/1978 | Keller et al. | 156/559 |
| 4,191,000 | 3/1980 | Henderson | 52/729 |
| 4,195,462 | 4/1980 | Keller et al. | 52/690 |
| 4,249,355 | 2/1981 | Anderson et al. | 52/593 |
| 4,336,678 | 6/1982 | Peters | 52/729 |
| 4,356,045 | 10/1982 | Elford et al. | 156/64 |
| 4,413,459 | 11/1983 | Lambuth | 52/729 |
| 4,456,497 | 6/1984 | Eberle | 156/257 |
| 4,458,465 | 7/1984 | Coe | 156/729 |
| 4,519,492 | 5/1985 | Focke | 198/408 |
| 4,601,384 | 7/1986 | van Doren | 198/481.1 |
| 4,665,306 | 5/1987 | Roland et al. | 425/174.4 |
| 4,846,923 | 7/1989 | Lines | 156/566 |
| 4,869,360 | 9/1989 | Brown et al. | 198/463.4 |
| 4,945,976 | 8/1990 | Ritola | 198/463.4 |

*Primary Examiner*—David A. Simmons
*Assistant Examiner*—William J. Matney, Jr.
*Attorney, Agent, or Firm*—Lowe, Price, LeBlanc & Becker

[57] ABSTRACT

A production line for manufacturing wooden I-beams wherein a pair of grooved flanges are conveyed along opposite sides of a train of web members and converged so that the web longitudinal edges are inserted into the chord grooves is disclosed. The flanges are each sequentially fed into left and right hand sides of the assembly line through a cam type flange feeder and a resiliently mounted hold-down member automatically orienting the flanges with the flange grooves facing inwardly. A lugged web feeder engages a longitudinal edge of each web to laterally convey same, or random web lengths, into the upstream end of the assembly machine. A web bottom drive engages the web undersides to convey same into contact with the flanges while eliminating overhead clutter to enable easy access to the web and flange members for manual intervention. The web bottom drive and run-up system within the machine is pivotally mounted to left and right hand sides support frames with the pivotal adjustment enabling the height of the web train to be co-elevational with the flange grooves to manufacture wooden I-beams of different thickness. One of the left and right hand support frames is laterally adjustable to impart a corresponding lateral adjustment between the pivotal support frames of the web run-up system to accommodate manufacture of wooden I-beams of different height. As the wooden I-beams exit the assembly machine, they are cut to desired length and then conveyed into a vertically extending wicket curing tower.

21 Claims, 12 Drawing Sheets

FIG. 8
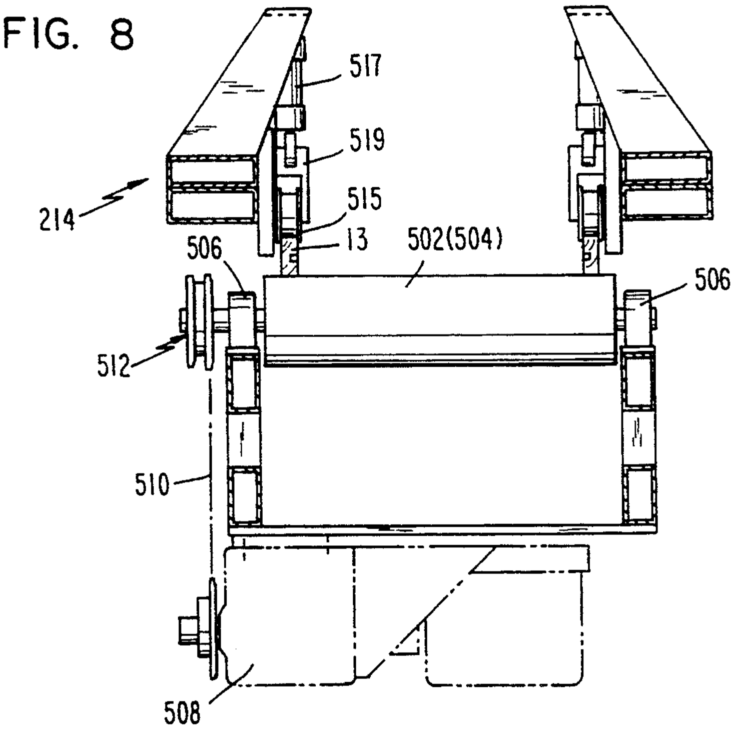
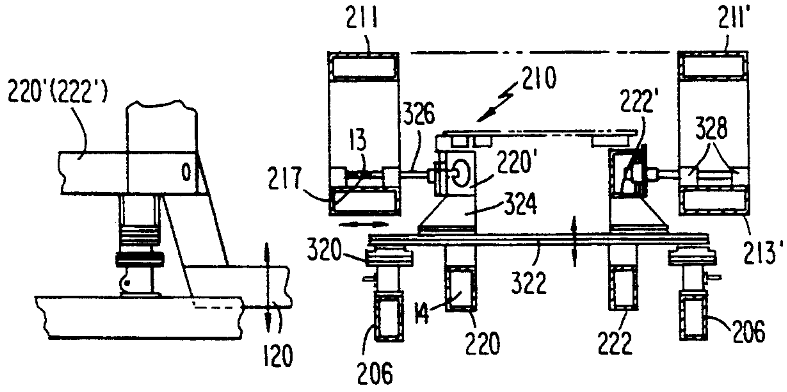
FIG. 9
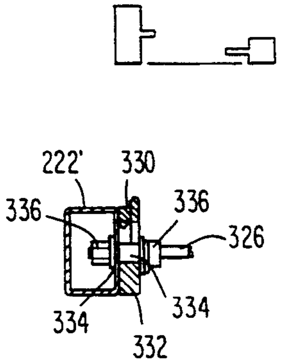
FIG. 9A
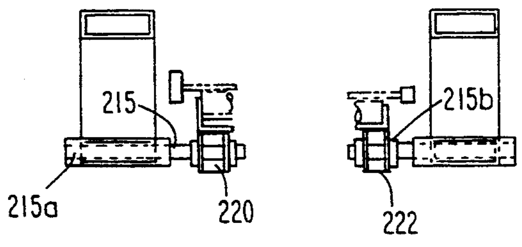
FIG. 10

METHOD AND APPARATUS FOR MANUFACTURE OF WOODEN I-BEAMS

This application is a continuation of application Ser. No. 07/645,450 filed Jan. 24,1991, now abandoned.

TECHNICAL FIELD

The present invention relates to improved apparatus and methods of making a wooden I-beam from a pair of wood flanges and web members interconnecting the flanges.

BACKGROUND ART

Fabricated wooden I-beams each comprising a pair of wooden flanges and web members having longitudinal edges received in grooves of the flanges are becoming increasingly popular due to the rising costs of sawn lumber and the scarcity of good quality wood capable of producing beams of large size. The fabricated wooden I-beams require less wood and also reduces the costs of transportation due to their lower weight. Wooden I-beams of this type have been disclosed extensively in the prior art with exemplary patents being U.S. Pat. Nos. 3,490,188, 4,074,498, 4,191,000, 4,195,462, 4,249,355, 4,336,678, 4,356,045, 4,413,459, 4,456,497 and 4,458,465.

Prior known procedures for forming fabricated wooden I-beams by gluing the members together have generally entailed the use of various sub-assemblies in which a series of webs are driven along a web conveyor line in either spaced or end-to-end abutting relationship, with a pair of grooved chords or flanges driven along opposite sides of the web conveyor. The flanges are driven with their grooves facing the webs and are gradually converged towards the conveyed webs so that the longitudinal web edges, usually pre-glued, enter the grooves to form an interconnecting glued joint therebetween.

In most prior art arrangements of which I am aware, the webs are typically conveyed into the upstream end of the assembly machine after being cut off the line into uniform lengths and widths. A lugged conveyor engages the trailing widthwise edge of each web to propel same into the assembly machine. Such an arrangement impedes the use of random length webs since adjustment of the web delivery and run-up infeed location in relation to the lugged infeed conveyor is necessary, requiring disruption in production and loss of production efficiency.

It is accordingly one object of the present invention to continuously deliver webs of constant or random length into a web infeed location of an assembly machine.

Another object of the invention is to deliver random length webs into the machine without requiring adjustments in the web feeder.

Another object of the invention is to deliver webs into the assembly machine by engaging a lengthwise edge of the web and propelling same into a web infeed location onto a series of web infeed driven rolls.

The chord or flange members are cut to desired lengths and widths by known sub-assemblies typically employed off the line. The chords are then conveyed into left and right hand infeed sides of the assembly machine for conveyance therethrough into converging contact with the web longitudinal edges. In the case where the flanges are pre-grooved off-line, it is necessary to ensure that the flanges are properly oriented into the assembly machine with the pre-grooved flange surfaces facing inwardly to ultimately engage the web lengthwise edges. Manual surveillance and intervention is often necessary to ensure proper orientation of the flange grooves entering the assembly machine.

Another object of the invention is to provide flange feeder apparatus for delivering grooved flanges into left and right hand infeed sides of the assembly machine with the flange grooves properly oriented to face inwardly.

Still another object of the invention is to provide a flange feeder which enables automatic positioning of grooved and ungrooved flanges into the left and right hand infeed sides of the assembly machine without manual intervention.

In various prior art arrangements of which I am aware, the web members are conveyed through the assembly machine along a horizontal plane by means of a web drive engaging upward facing surfaces of the web. This overhead web drive introduces clutter and prevents easy overhead access to the web and flange members to alleviate problems which may occur during the assembly process. Such overhead web drives also make it difficult to easily and quickly adjust the flange run-up and the web drive to manufacture I-beams of different height and width.

Another object of the invention is to drive the web members through the assembly machine with a bottom drive arrangement located below the webs for improved overhead access.

Still another object is to provide a web bottom drive which is easily adjustable to accommodate webs of different width to manufacture wooden I-beams of correspondingly different height.

After the webs are joined to the chords by converging the chords towards the webs so that the web lengthwise edges enter the flange grooves, the resulting I-beam is conveyed from the assembly machine where it is cut to desired length using known cutting means. Thereafter, the cut I-beams are conveyed to downstream, off-line inspection and bundling stations where they can be packaged for shipment. To provide the glued joints with sufficient curing time, it is customary in the industry to convey the cut I-beams along a long lateral conveyor before the beams are packaged for shipment. Such a conveyor occupies considerable floor space depending upon the minimum cure dwell time conditions that must be satisfied before bundling and shipment occurs.

Yet another object is to minimize curing floor space by conveying the cut I-beams into a vertically extending curing tower in which the beams are disposed for a minimum cure dwell period before being bundled and shipped.

SUMMARY OF THE INVENTION

In accordance with the present invention, a production line assembly for manufacturing a wooden I-beam from a pair of longitudinally grooved elongated wooden chord members and planar wooden web members comprises a web run-up and drive system for conveying the web members in end-to-end relationship as a continuous web and a flange run-up and drive system for driving pairs of flanges along opposite sides of the continuous web with longitudinal chord grooves facing the web. Means is provided for directing the flange pair towards opposing longitudinally extending sides of the continuous web so that these web sides are respectively inserted into the flange grooves to form an interconnecting joint therebetween and thereby the wooden I-beam. A beam drive conveys the beam out of the production line assembly for cutting into desired beam lengths.

In accordance with one feature of the invention, the individual flanges are conveyed into respective flange infeed locations through a pair of chutes having outfeed locations which are respectively in-line with the flange drives for conveying the flanges along the opposite lengthwise edges of the webs. Controlled feeding of the flanges into the chutes occurs with a cam type flange feeder cooperating with a resiliently mounted hold-down jointly defining the inlet to the chute. The flanges are delivered to the respective chute inlet locations with upper and lower transfer conveyors. A predetermined number of in-line flanges are grouped at a feed location adjacent the chute inlet. The feed location is in part defined by a first cam portion located beneath the conveyor. Timed rotation of the cam causes a cam pushing surface to engage a trailing surface of the end flange of the group causing the flange(s) to resiliently deflect the hold-down to enter the chute for passage to the outfeed location.

As the pushing surface advances with the flanges into the chute, a second or trailing cam portion extends into the feed location to prevent subsequent flanges from being fed into the chute in an uncontrolled manner. The second cam portion descends downwardly through the chute and, as it clears the chute, it disengages from the hold-down. The hold-down springs back to its neutral position to prevent the next group of flanges from entering the chute until timed rotation of the cam again occurs.

In the case where pre-grooved flanges are fed to the flange feeder with the grooves of the flanges on both the upper and lower conveyors facing upwardly, the flexible hold-down associated with the upper conveyor is pivotally mounted to assume a raised and a lowered position. In the lowered position, the flanges traveling along the upper conveyor are conveyed over the hold-down along an uninterrupted slide ramp, in part defined by the hold-down, where the flanges are grouped onto a flat accumulating surface of the cam which terminates in the pushing surface. The grooves face upwardly. The hold-down is then rotated to its raised position to define part of the associated chute inlet. The cam then rotates counter-clockwise to direct the flanges into the chute against resilient yielding movement of the hold-down and under the action of the pushing surface. In this manner, the upwardly directed grooves of the flanges are automatically located to face inwardly upon being loaded into the chute.

In accordance with another feature of the invention, the web members are delivered to a web infeed location in line with the upstream end of the production line assembly along a series of conveyors extending laterally in relation to the longitudinal axis of conveyance of the assembly machine. A first laterally extending infeed conveyor delivers either single or stacks of webs to a staging conveyor which in turn delivers predetermined quantities of webs to a lugged conveyor having a discharge end off-loading the individual webs to the web infeed location along a slide path. On each of the aforesaid conveyors, the webs extend with their lengthwise edges perpendicular to the direction of conveyance and parallel to the direction of conveyance within the production line assembly machine. The lugs on the lugged conveyor engage the trailing lengthwise edge of each web to advance same to the web infeed location down the slide ramp. By engaging the lengthwise edge of the web, random length webs may be fed to the production line assembly without requiring any adjustment in the production line assembly or the web feeder mechanism.

In accordance with yet another feature of the invention, the individual webs entering the assembly line from the web infeed roll cases are advanced into contact with a series of longitudinally spaced bottom driven rolls engaging the undersides of the web members. These bottom driven web rolls are respectively mounted to a pair support rails pivotally secured at their upstream ends to left and right hand longitudinally extending machine frames. The down stream ends of these support rails are raised and lowered with an appropriate vertical drive to correspondingly raise and lower the web driven rolls to elevationally adjust the path of conveyance of the webs within the assembly machine. Thereby, the pivotal supporting rails for the web run-up and drive system enables the web longitudinal edges to be co-elevational with the opposing grooves of the flanges being conveyed along opposite sides of the webs within the assembly machine. The web bottom drive rolls are driven with a chain and sprocket arrangement also located beneath the web train.

The points of connection between the left and right hand side machine frames and the downstream ends of the web drive support rails occur through slotted pin connections whereby the pins extending through the downstream ends of the web support rails are free to move through slots in the left and right hand frames to enable pivotal movement of the web support rails to occur without requiring corresponding movement of the frames. The left hand frame is transversely adjustable to accommodate manufacture of wooden I-beams of different height (i.e., webs of different width) through a series of side adjustment screws and slider shafts extending between the left hand frame and stationary support bases. In this manner, beam depth and thickness adjustments are easily effected independent of each other.

After the chords and webs are joined to form the wooden I-beam which is then cut into desired length, the cut beams are conveyed out of the assembly machine into a wicket curing tower which is a vertically extending conveyor defined by top and bottom support rolls around which are trained a series of longitudinally spaced chains. The chains support pairs of arms extending outwardly from the chains to define a series of slots into which the cut I-beams are respectively conveyed. The individual slots carrying successive cut beams ascend along the upstream side of the conveyor, over the top roll and then descend along the downstream side while maintaining a horizontal or upward and outward inclination to prevent the beams from being dropped out of the slot. The wicket curing tower thus provides a minimum cure dwell time for the cut I-beams while occupying minimal floor space before the cut beams are then delivered to bundling locations for subsequent shipment.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

Figure 1A:
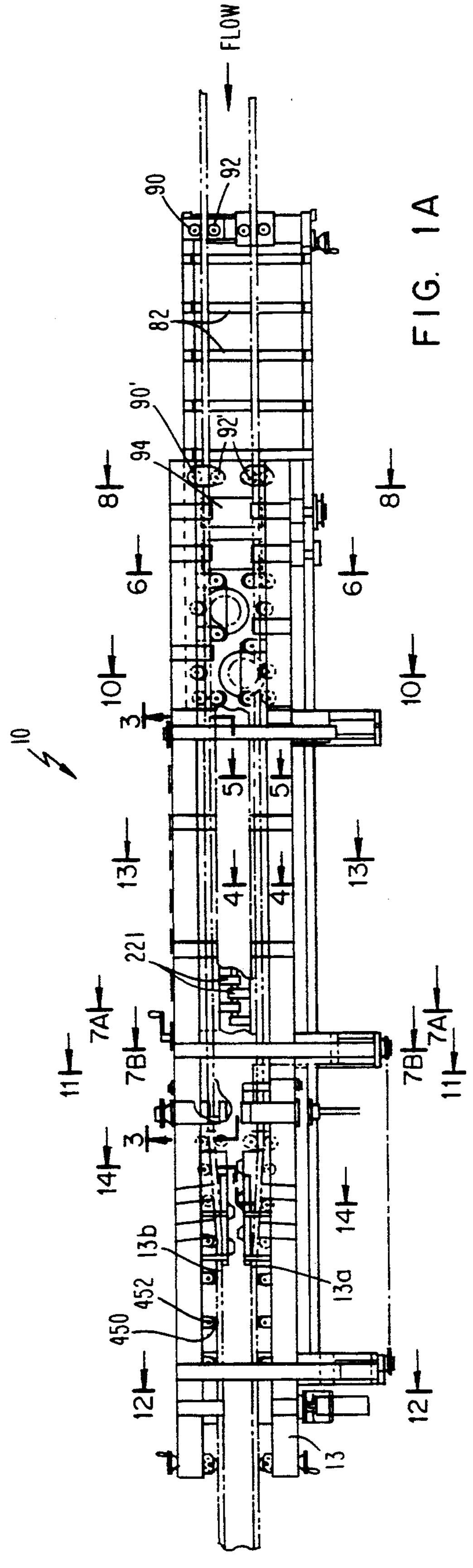
FIGS. 1A and 1B are plan and side elevational views , respectively, of an I-beam assembly machine constructed in accordance with the present invention.
Figure 1B:
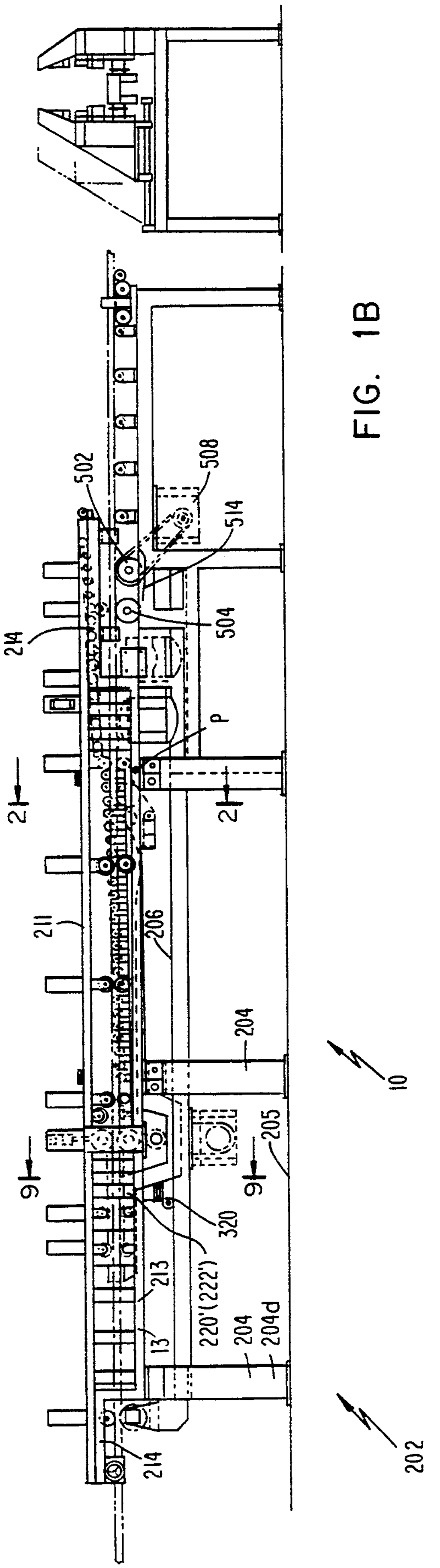
Figure 11:
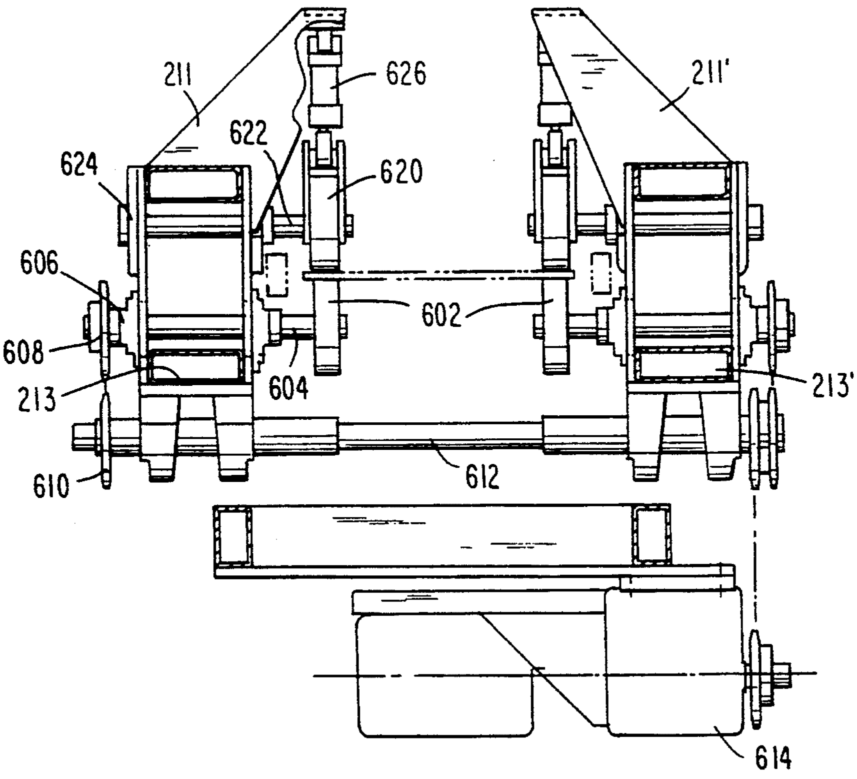
Figure 12:
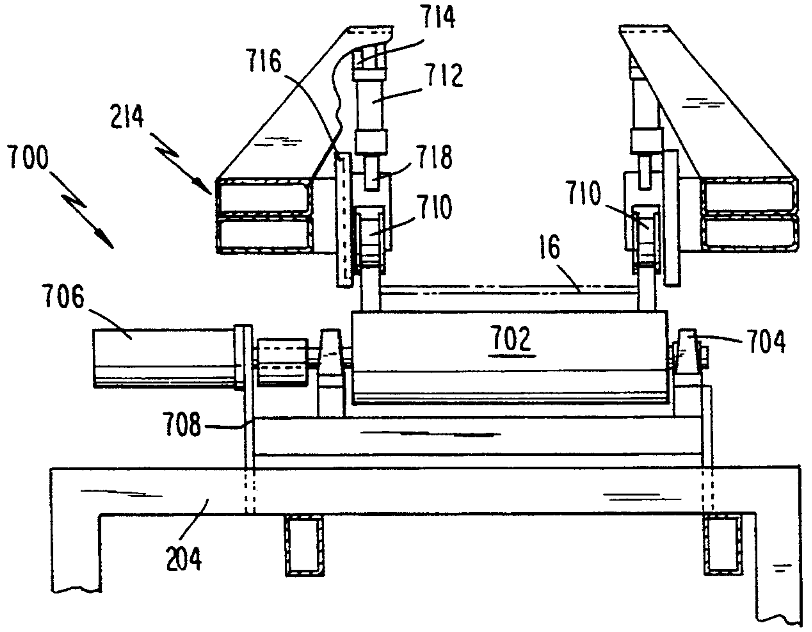
Figure 13A:
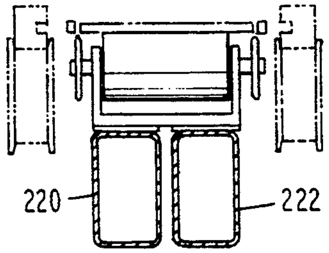
Figure 13:
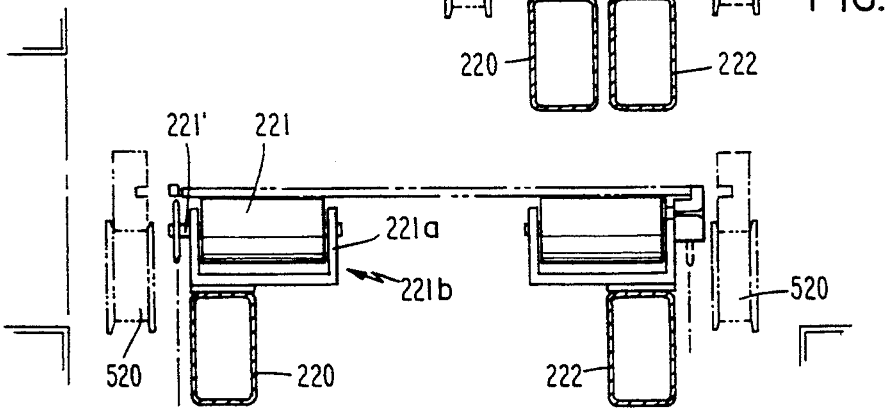
Figure 14:
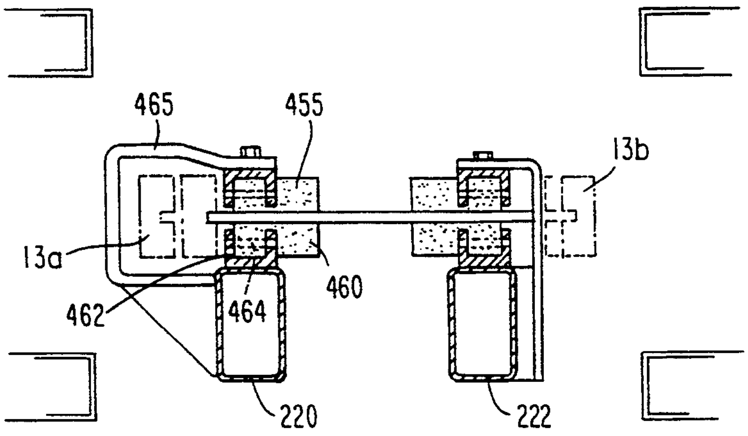
Figure 14A:
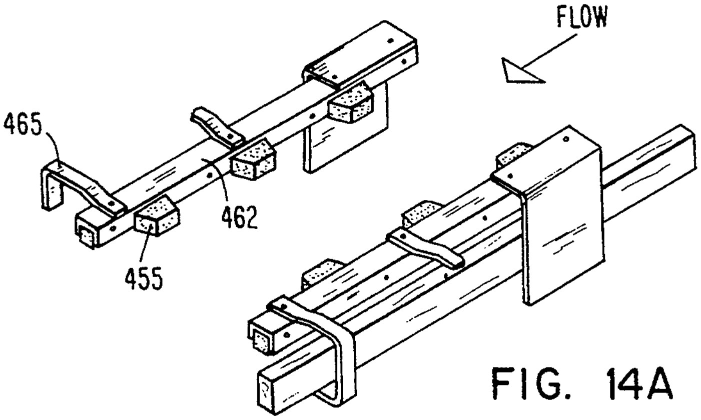
Figure 16:
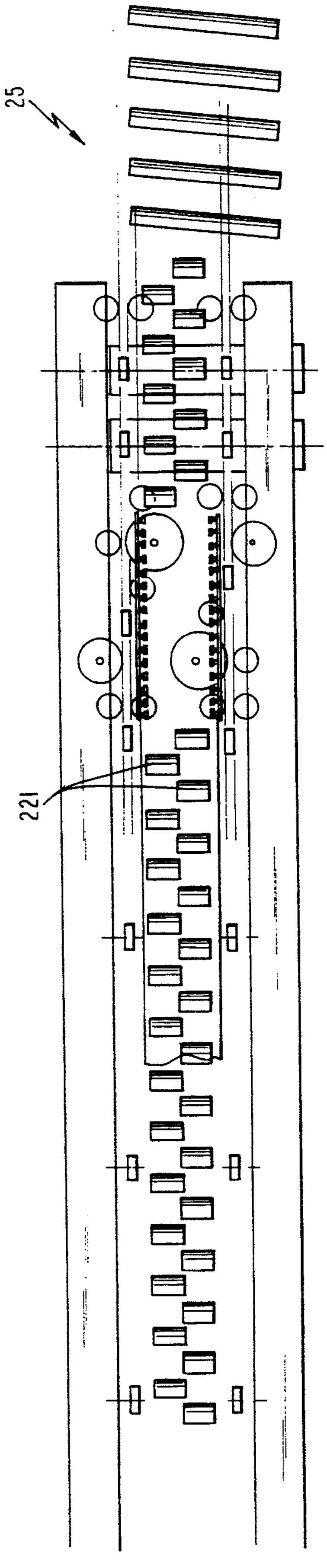
Figure 15:
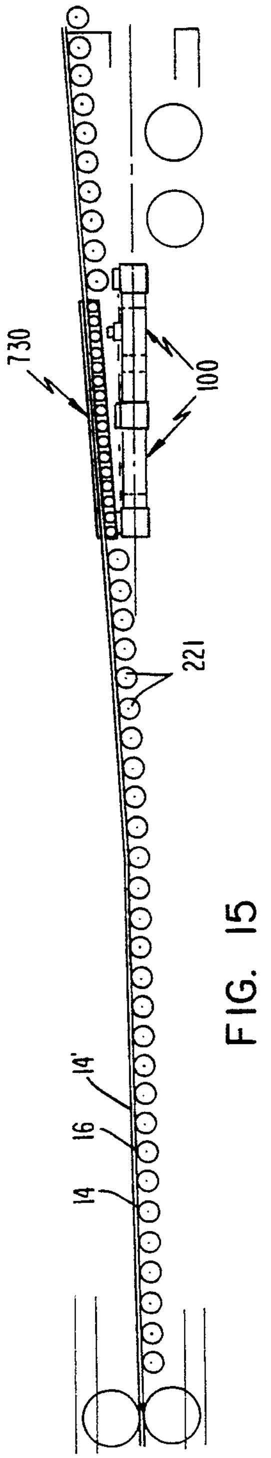
Figure 15A:
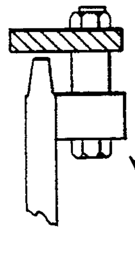
Figure 17:
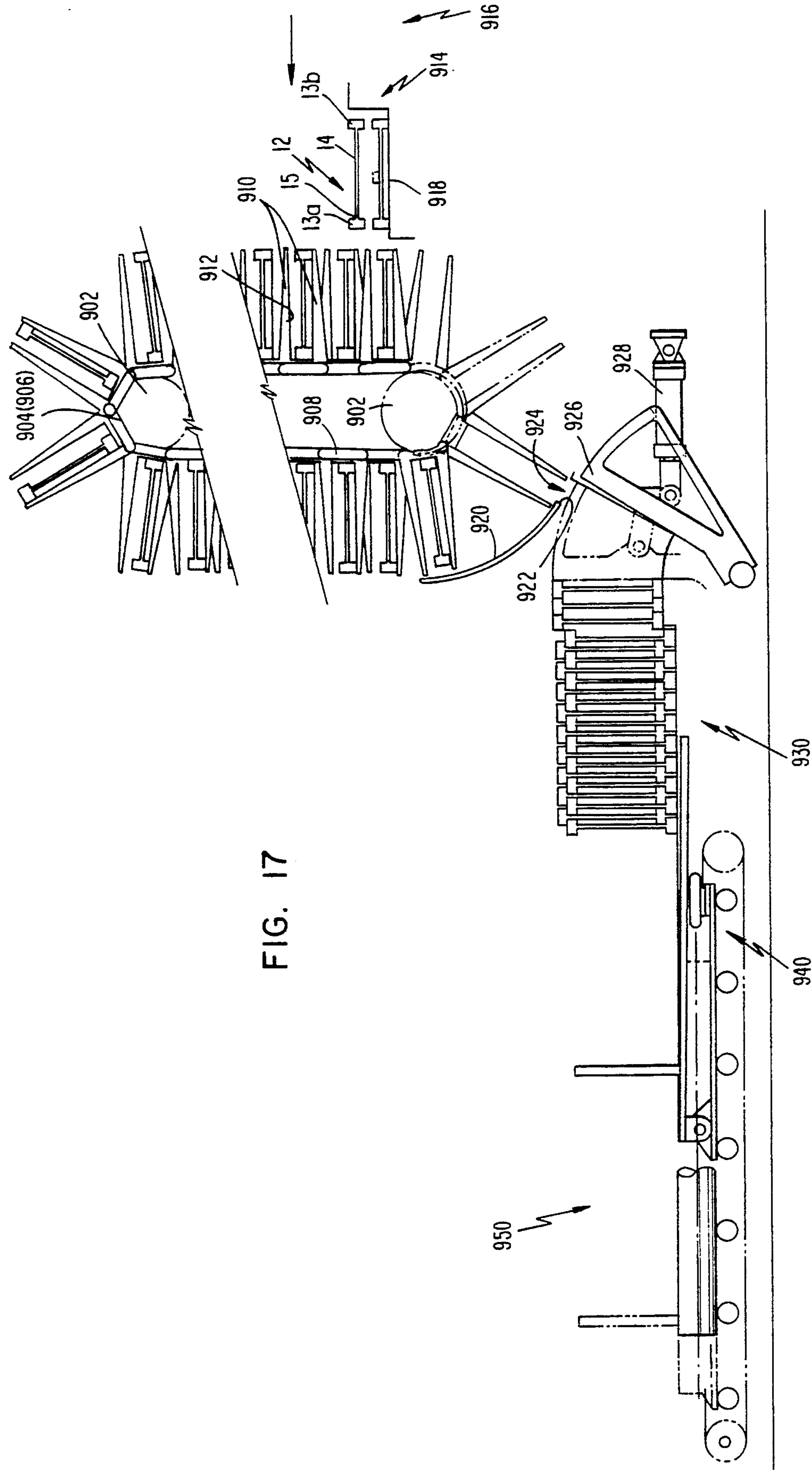
Figure 18:
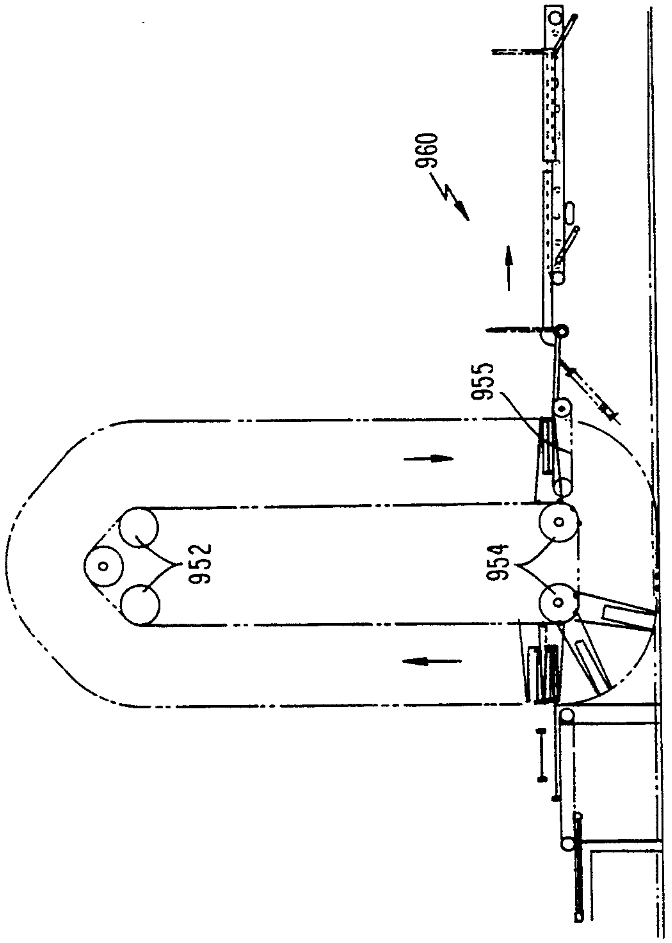
Figure 24:
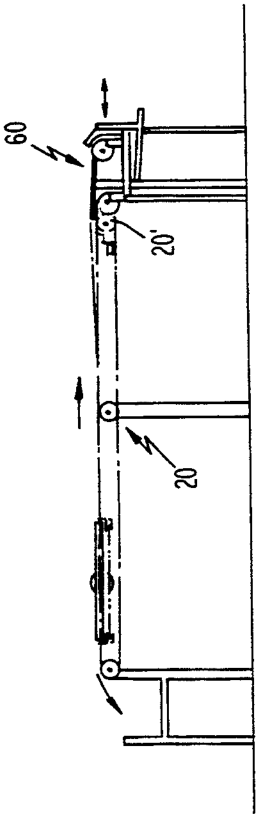
Figure 19:
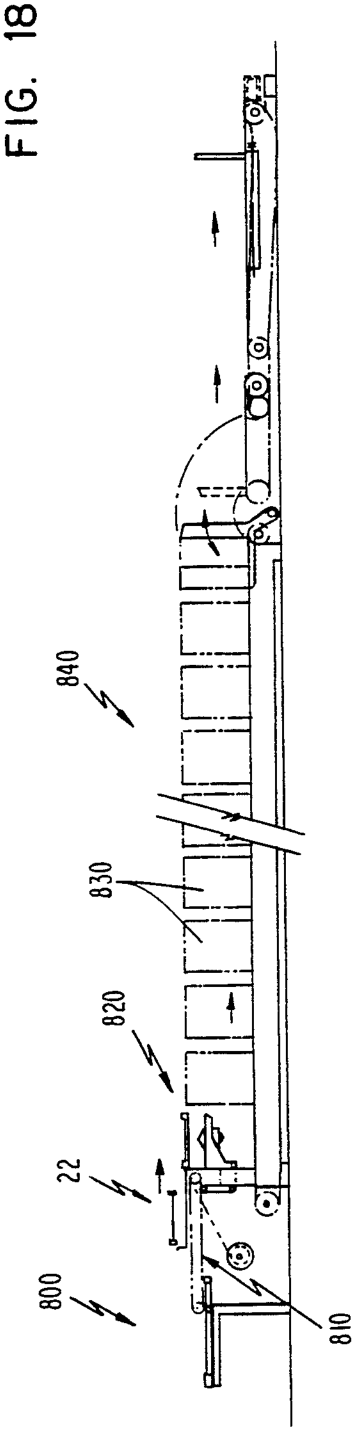
Figure 20:
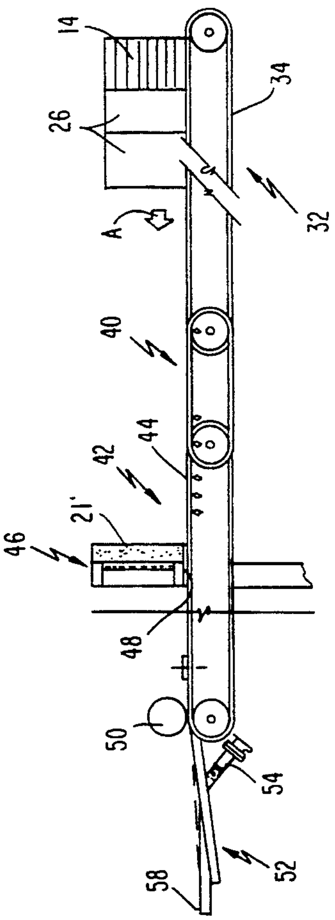
Figure 21:
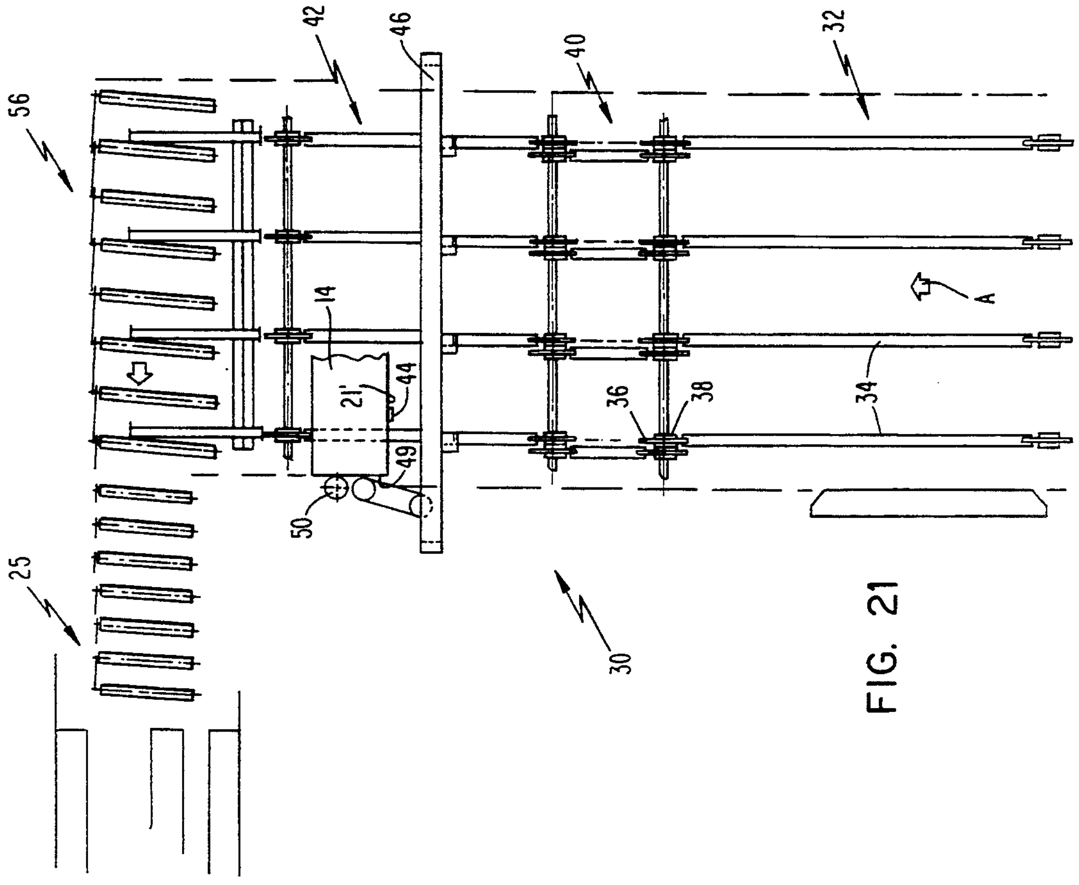
Figure 22:
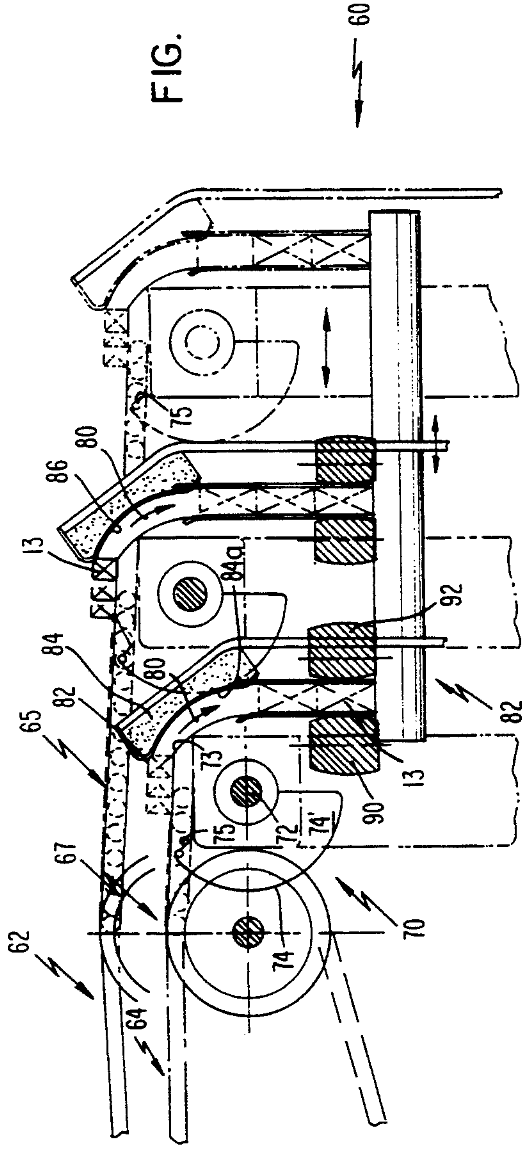
Figure 23:
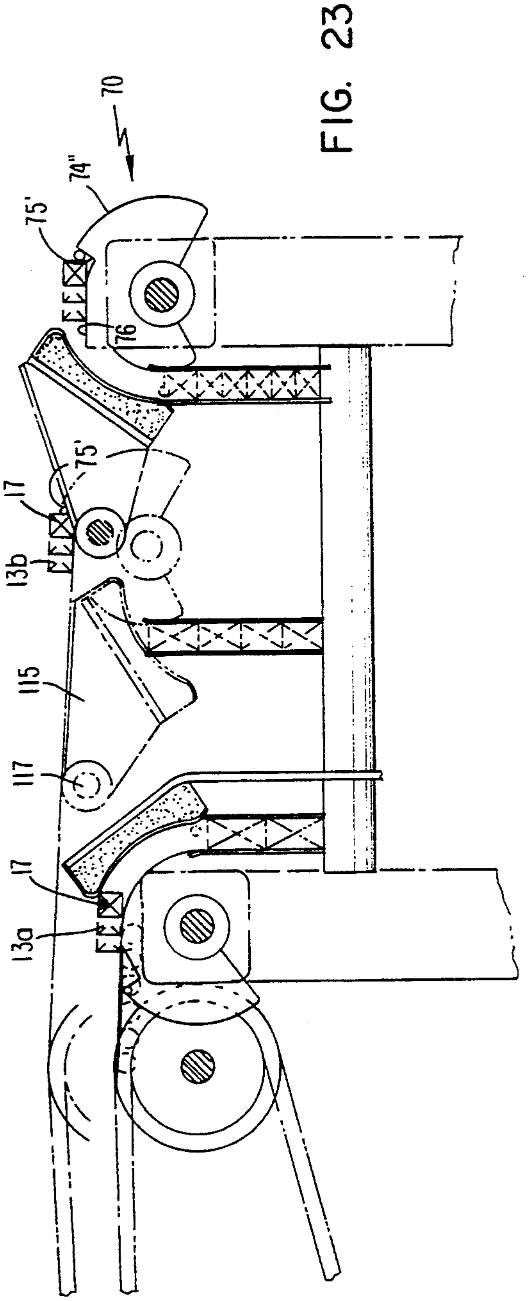

7A and 7B generally taken along the line 7—7 of FIG. 1A depict side screw drive mechanisms for adjusting the left hand frame of the assembly machine;

FIG. 8 is a sectional view taken along the line 8—8 to depict the flange drive and hold-down of the invention;

FIG. 9 is a sectional view taken along the line 9—9 of FIG. 1B to depict a feature of the web height and guide adjustment mechanism;

FIG. 10 is a sectional view taken along the line 10—10 of FIB. 1B to depict the web guide pivot support;

FIG. 11 is a sectional view taken along the line 11—11 of FIG. 1A to depict the web drive and hold-down;

FIG. 12 is a sectional view taken along the line 12—12 of FIG. 1A to depict the beam retard and hold-down;

FIG. 13 is a sectional view taken along the line 13—13 of FIG. 1A depicting an adjustment feature of the web feed and close-up conveyor;

FIG. 14 is a sectional view taken along the line 14—14 of FIG. 1A to depict further features of the web guide mounting channels;

FIG. 15 is a partial elevational view of the web drive system within the assembly machine;

FIG. 15A is a detailed elevational view of a lift-out roller section of the web drive;

FIG. 16 is a schematic plan view depicting various aspects of the assembly machine;

FIG. 17/ is a sectional view of a first embodiment of a wicket curing tower in accordance with the present invention;

FIG. 18/is a partly sectional, partly schematic view of an alternative embodiment of a wicket curing tower;

FIG. 19 is a schematic sectional view of a conventional I-joist conveyor;

FIG. 20 is a sectional view of a web feeder conveyor in accordance with the invention;

FIG. 21 is a top plan view of the web feeder of FIG. 20;

FIG. 22 is a sectional view of a flange feeder for feeding ungrooved flanges into the assembly machine flange infeed roll case;

FIG. 23 is a flange feeder of the invention for feeding grooved flanges into the assembly machine; and FIG. 24 is a schematic elevational view of a flange feeding station into the assembly machine.

BEST MODE FOR CARRYING OUT THE INVENTION

An assembly line 10 as depicted in FIGS. 1A and 1B is utilized in a production area 10' (FIG. 1C) for making wooden I-beams 12 (FIG. 17) having wood flanges or chords 13*a* and 13*b* and wood web. members 14. The assembly line 10 performs different operations to secure the flanges 13*a*,13*b* to the series of webs 14 to form web-to-chord joints 15 such as depicted in FIG. 17. Each web 14 is preferably formed of plywood or oriented strain board ("OSB" which is a form of flake board wherein strains of wood are oriented, overlapped and secured together by suitable glues to achieve strength properties superior to plywood) or the like. The webs 14 may be of varying thickness and, in the assembled wood I-beam 12, forms a plurality of abutted sheets 14,14' (FIG. 15) of such boards. The sheets 14 are rectangular having a long dimension along a longitudinal axis which is substantially parallel to the longitudinal axes of the elongated chords 13*a*, 13*b*. The webs 14 form butt Joints 16 with one another preferably secured together with adhesive or glue.

Each chord 13*a*,13*b* has a generally rectangular cross-section perpendicular to its longitudinal axis. The chords 13*a*,13*b* may be formed of commercially available wooden structural boards or may be formed of laminated veneer lumber ("LVL") which is readily available in a large variety of lengths and thicknesses. The chords are cut from rectangular stock material and provided with grooves 17 (FIG. 14) either off the assembly line 10 at a flange forming area in a known manner, or within the assembly line as described, infra. After forming off the assembly line, the grooved chords (or ungrooved chords as described infra) are discharged onto an outfeed table 18 (FIG. 1C) for transfer to a flange feed location (FIG. 24) via a lateral conveyor ramp 20. The chords are respectively grouped on opposite sides of a web infeed location for feeding into the assembly machine 10 along opposite sides of the webs with a unique flange feeder depicted in FIGS. 22 and 23 as described below.

The individual web members 14, pre-cut to desired length and width, undergo a beveling operation whereby their upper and lower longitudinal edges are beveled or tapered as at 21 (FIG. 4) to respectively interfit with the chord groove 17 as described below. The grooves 17 preferably have the same cross-section as the web beveled edges 21 or may have other cross-sections as known in the art.

Figure 5:
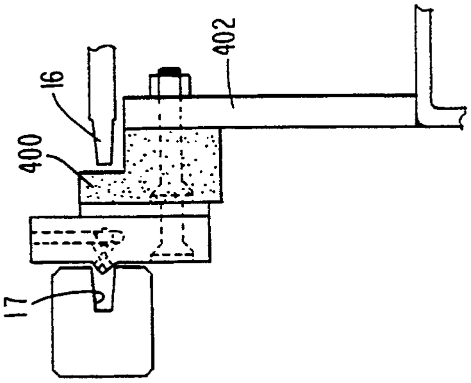
FIG. 5 is a sectional view taken along the line 5—5 of FIG. 1A depicting various features of web guide supports for centering the web within the conveyor system and for applying adhesive to the flange grooves.

The chords 13*a*,13*b* are conveyed respectively along the opposite sides of the webs 14 which may be formed as a continuous web in the assembly line 10. The chords 13*a*,13*b* are gradually converged (in the area downstream from section lines 14—14 in FIG. 1A) towards the continuous web 14 so that the beveled edges 21 enter the grooves 17 to form a press-fitted interconnecting joints 15 therebetween and thereby the wooden I-beam 12. The beveled edges 21 and grooves 17 are preferably glued (FIG. 5) prior to joining. The wooden I-beam may be passed through a radio frequency tunnel as is well known which cures the glued joints of the I-beam. The I-beam 12 is discharged onto a outfeed table 22 (FIG. 1C) provided with a flying cutoff saw 24 cutting the beam to desired length. The cut beams are transferred laterally from the outfeed table 22 by means of a unique cross-transfer conveyor (FIGS. 17 and 18) which provides a minimum cure dwell time before the beams are ultimately stacked and bundled for subsequent shipment.

DELIVERING THE WEBS TO A WEB INFEED LOCATION

Prior to delivery of the webs 14 to a web infeed location 25 (FIGS. 1C), the webs are first formed in a web preparation line as well known in the art which can be designed to process 4'×8', 4'×16', 8'×4' or 8'×8' panels of thicknesses of ⅜-1" . Such a known web preparation line ( not shown) generally comprises three machining centers: a double end tenoner for machining the web/web joint onto the panel ends, a panel saw for ripping the panels to web widths, and a second double end tenoner for machining the web/flange Joint onto the web edges. The known system may also comprise an automatic panel feeder, an off-size size web picker/-stacker, a web surge hopper between ripping and edge machining operations and an automatic stacker. With reference to FIGS. 20 and 21, the resulting web stacks 26 may be delivered directly to the web feeder 30 of the assembly machine 10 or by fork truck.

In accordance with the invention, the web feeder 30 depicted in FIGS. 20 and 21 comprises a web stack infeed chain conveyor 32 upon which the web stacks 26 are placed with their longitudinal axes perpendicular to the direction of conveyance A. The infeed conveyor 32 comprises a plurality of chains 34 trained around appropriately positioned sprockets 36 mounted upon rolls 38. The stack infeed conveyor 32 conveys the stacks 26 to a web stack singulator/staging chain conveyor 40 positioned co-elevationally between the infeed conveyor 32 and a lugged web singulator/feed chain conveyor 42 downstream from the staging conveyor. Each of the aforesaid conveyors 32,40 and 42 is similarly configured with sets of chains 34 trained around sprockets 36 carried by rolls 38 except that the feed chain conveyor 42 is provided with lugs 44 at spaced intervals projecting upwardly from the upper run of the feed conveyor.

The staging chain conveyor 40 is timed to deliver a single stack of webs onto the feed chain conveyor 42 from the infeed chain conveyor 32. This stack may be conveyed into contact with a schematically depicted web stack hold-back frame 46 extending vertically above the upper run of the feed conveyor 42. An adjustable gap 48 formed between a lowermost surface of the hold-back 46 and the upper run of the feed conveyor 42 is dimensioned to enable feeding of a single web member 14 from the bottom of the stack 26 advanced through the gap by the lugs 44 contacting the longitudinal edge 21' of the web. As the web 14 is conveyed through the delivery gap 48 by the lugs 44 engaging its upstream longitudinal or lengthwise edge 21', it moves towards the discharge end of the feed chain conveyor 42. The leading transverse edge 49 of the web 14 contacts an end gluing roll 50 advantageously positioned to apply adhesive glue to the leading edge. The web members 14 are then individually discharged along a skate wheel ramp 52 (which may be adjustable with cylinder 54 to accommodate different web widths) onto driven canted web infeed rolls 56. The downstream lengthwise edge of the webs 14 contact a fence 58 and are then guided along the driven rolls 56 into the assembly machine 10 in the manner described more fully below.

By orienting the web feed conveyor to receive single webs 14 or stacked webs extending with their lengthwise edges 17 perpendicular to the direction of conveyance A, there is advantageously provided the capability of feeding in webs of random or large lengths into the web infeed driven rolls 56 of the assembly machine 10 since the webs are propelled by the lugs 44 engaging the web lengthwise edges.

DELIVERING THE FLANGES TO THE ASSEMBLY MACHINE

The flanges 13*a*,13*b* are delivered via conveyor 20 (FIG. 24) to the assembly machine 10 in pre-cut lengths and widths, either ungrooved (with grooving to occur within the assembly machine as described below) or with pre-cut longitudinal grooves 17 formed off-line in one of the flange faces in a manner known in the art.

Referring to FIG. 22, an embodiment of a flange feeder 60 according to the present invention will now be described for conveying ungrooved flanges 13 to the assembly machine. As depicted therein, the pre-cut ungrooved flanges 13 are transferred, via a known transfer mechanism (not shown) from conveyor 20 to an upper chain conveyor 62 and a lower chain conveyor 64 (it will be appreciated that the discharge end of conveyor 20 may be displaced vertically by timed vertical movement of roll 20' in FIG. 24 to effectively define the upper and lower conveyors and achieve timed feeding of chords 13 to ramps 65,67). The flanges 13 traveling on the upper and lower laterally extending transfer conveyors 62,64 are respectively discharged onto a downwardly inclined, upper or lower skate wheel transfer ramp 65 and 67 where the flanges are stationed with respective cylinder operated cam type flange feeders 70 adapted to contact and index individual flanges into a feed chute 80 terminating above an assembly machine infeed roll case 82 which feeds the flanges from the lower and upper transfer conveyors 62,64 to the right and left hand sides of the assembly machine 10, respectively.

More specifically, each cam 70, mounted for rotation on a horizontal shaft 72, includes a first circumferentially extending arcuate cam surface 73 of lesser radius than a second circumferentially extending arcuate cam surface 74 separated by a radially extending pushing surface 75 connecting the first and second surfaces. In the position depicted in FIG. 22, one or more flanges 13 are disposed on the upper or lower surfaces 65 or 67 and the associated first cam surface 73 which defines the inlet to the flange feed chute 80 together with the upper end 82 of a foam rubber backed flexible steel hold-down 84 opposing the first surface and extending vertically upwards from the first surface and the skate wheel transfer ramp. The inlet gap is less than the flange width to thereby prevent the flanges 13 from being fed in an uncontrolled manner into the chute 80 onto the infeed roll case 82. Rotation of the cam 70 in the clockwise direction causes the pushing surface 75 to advance into contact with a lengthwise edge of the flange 13 to exert a pushing force which causes the flange to be fed into the chute against the resilient bias of the hold-down 84 which yields in response to the pushing force acting through the flange. The flanges 13 are then-stacked within the chute 80 for feeding along opposite sides of the web train in the assembly machine 10 as discussed infra.

As the pushing surface of each cam 70 rotates towards the associate infeed chute 80, the trailing second surface 74 extends upwardly into the associated ramp 65 or 67 of the skate wheel transfer to prevent other in-line flanges from being conveyed into the chute, thereby sequentially and individually feeding the flanges into the chutes during each controlled rotation of the cam type flange feeder.

Two pairs of outfeed pinch rolls 90 and 92, rotatable about vertical axes and respectively associated with each chute 80, form a flange run-up drive in which the bottommost flange in each chute is conveyed into the assembly machine 10 towards a like second set of pinch rolls 90',92' (FIG. 1A). Upon being conveyed through the second set 90'92', each flange 13 contacts a flange drive roll 94, described infra, providing positive conveyance of the flanges through the assembly machine. Such outfeed pinch rolls are considered conventional and other outfeed systems may be employed.

Although not shown in detail, the next in-line flanges disposed in each chute 80 above the bottommost flanges are prevented from being dragged by movement of the bottommost flange through the chute with appropriate stop means as will be known in the art from review of this disclosure.

As the pushing surface 75 of the respective flange feeder cams 70 enters the chute 80, the second arcuate cam surface 74 functions as a hold-back surface by projecting into the skate wheel transfer ramp 65 or 67 to prevent next in-line flanges accumulating on the transfer ramp from entering the chute. The radius of curvature the second or hold-back surface 74 is dimensioned to enable the portion 74' of the cam defined by the second surface to enter the chute 80 in opposition to the flexible hold-down surface 84*a*. As the trailing end of the second cam portion 74' clears the transfer ramp 65 or 67 and descends into the chute 80, the next in-line flange is free to slide along the transfer ramp towards the now unobstructed inlet to the chute. However, the resilient hold-down 84 is configured to restore itself to its unbiased position (once the trailing end of second cam portion 74' clears and disengages from upper end 82 of the hold-down by descending therebelow into the concavity 86) where the upper end 82 of the hold-down is spaced from the first cam surface 73 to define a chute inlet having a dimension less than the height or width of the individual flanges. In this manner, the upper end 82 of the flexible hold-down 84 functions as a stop surface preventing the next-in-line flange from entering the chute 80 until the cam flange feeder 70 is again rotated in a controlled manner to cause the pushing surface 75 to enter the transfer ramp 65 or 67 into contact with one of the flanges which then exerts a pushing force causing the hold-down 84 to deflect under resilient bias and enable the pushing surface to rotate the next group of flanges into the chute.

Figure 6:
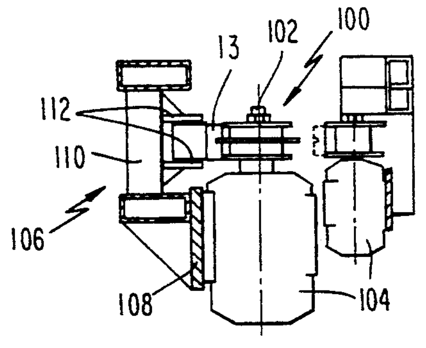
FIG. 6 is a sectional view taken along the line 6—6 of FIG. 1A to depict in-line routing of flange grooves.

With reference to FIG. 6, as the ungrooved flanges 13 are conveyed by the flange drives 94 through the assembly machine 10, the inwardly facing vertical surface of each left and right flange engages a grooving head 100 mounted for rotation on a vertical output shaft 102 of a router motor 104 appropriately secured to the assembly machine frame 106 with suitable vertical mounting plates 108. The flange 13*a* or 13*b* is maintained in proper alignment with the grooving head 100 by means of a back-up roll 110 mounted to the frame 106 with horizontally extending support arms 112 for vertical rotation. A like grooving arrangement is longitudinally spaced from the aforesaid cutter to groove the inwardly facing vertical surface of the left hand flange 13*b*.

As can be seen from FIG. 15, the in-line cutter heads 100 for grooving the flanges 13*a*, 13*b* are disposed elevationally beneath the web drive to enable in-line grooving to occur without impeding web feeding as will be described more fully below.

Splitting/grooving machines are also known in the art for grooving the flanges 13 off-line. Such known splitting-grooving machines generally utilize a splitter and groover mechanism in which rectangular stock material is cut into two flanges with a vertical circular splitter blade fixed to the horizontal axis of the output shaft. A pair of rotor blades are also fixed to the output shaft in parallel relationship to opposite sides of the splitter blade and spaced therefrom to simultaneously cut grooves in the upward facing surface of the flange stock. These cut chords are then conveyed with their grooves facing upwardly along the upper and lower flange transfer conveyors 62,64.

FIG. 23 is an illustration of a further embodiment of a flange feeder 60 to be utilized in conjunction with previously grooved flanges 13*a*, 13*b*. The flexible hold-down and cam type flange feeder associated with the lower transfer conveyor 64 and ramp 67 is substantially identical to the corresponding cam 70 and hold-down 84 depicted in the embodiment of FIG. 22 since the flanges 13*a* with their grooves 17 facing upward will be conveyed into the right hand infeed chute 80 with their grooves properly oriented inwards in facing relationship to the web longitudinal edges 21.

To ensure that the flanges 13*b* traveling along the upper conveyor 62 and upper ramp 65 are fed into the left hand chute 80 with their upwardly facing grooves facing inwardly into facing relationship with the left hand lengthwise edges of the webs 14, the flexible hold-down 115 associated with the upper conveyor is pivotally mounted to a horizontal shaft 117 to assume a lower position (phantom lines) whereupon the flanges traveling along the upper transfer ramp 65 are free to slide downwards over the hold-down to abut against the radial pushing surface 75' of the cam type flange feeder 70' to rest upon a flat surface 76 extending from the pushing surface in coplanar relation with the transfer ramp 65 of the upper conveyor. When one or a suitable number of grooved flanges have been loaded onto the aforementioned accumulating surface 76 of the left hand cam type flange feeder 70', the pivotal hold-down is raised to the solid line position depicted in FIG. 23 to enter the transfer ramp 65 and prevent other flanges from being loaded onto the flange feeder cam. This flange feeder cam 70' is then rotated counter-clockwise to transfer the flanges into the left hand chute 80 with their grooves 17 properly facing inwardly. The left hand cam type flange feeder 70' is formed with a second circumferentially extending arcuate cam surface 74" as described in connection with the FIG. 22 embodiment.

The left hand cam type flange feeder 70,70' and associated hold-down 84,115 of both the FIG. 22 and 23 embodiments are mounted for sliding adjustment in the transverse direction of the assembly machine 10 to accommodate manufacture of wooden I-beams of different height. Details of the mounting structure enabling such adjustment to occur are omitted but will be obvious to one of ordinary skill in the art from a review of this disclosure.

CONVEYING THE WEBS THROUGH THE ASSEMBLY MACHINE

The web members 14 are sequentially fed from the web infeed conveyor 42 to the web feeder driven rolls 25 located in line at the entrance end of the assembly machine 10 depicted in detail in FIGS. 1–13. The chords 13*a*,13*b* are fed along opposite longitudinal sides of the web members on infeed roll cases 82 as described supra.

The chords and webs assembly machine 10 comprises a fixed immovable base 202 formed from a plurality of longitudinally spaced transversely extending base members 204 depicted in FIG. 1B. Each base member 204 has a pair of vertical support legs 204*a* and 204*b* resting on a support floor 205 and a horizontal transverse brace 204*c* (FIG. 7) interconnecting the upper ends of the vertical legs. A pair of longitudinally extending left and right hand (as viewed in FIG. 9) frame members 206 are attached to the upper ends of the vertical legs 204*a*,204*b* to rigidly interconnect the base members 204 to form the rigid base 202.

The base 202 supports a web drive and hold down assembly 210 which is adjustable in both elevation and width to enable formation of beams of varying depth and thickness. The web drive and hold down assembly 210 includes a movable left hand frame formed by upper and lower frame members 211 and 213 (FIGS. 7 and 9 ) extending generally the full length of the assembly machine 10 and a fixed right hand frame formed by upper and lower frame members 211′ and 213′ which are respectively identical to frame members 211,213 but incapable of elevational or translational adjustment. As depicted in FIG. 1B, the opposite ends of lower frame members 213 and 213′ include upwardly and outwardly angled sections 214 connected to corresponding straight ends of upper frame members 211 , 211′ to provide basic support for the various flange and web drive and hold down rolls described, infra.

Figure 7C:
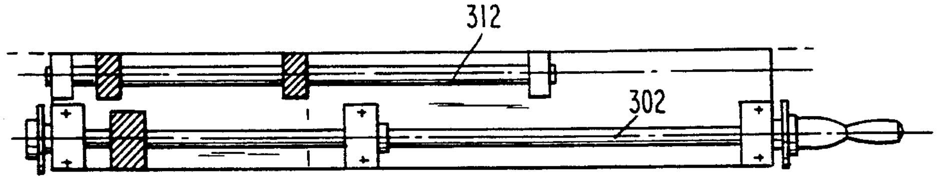
Figure 7B:
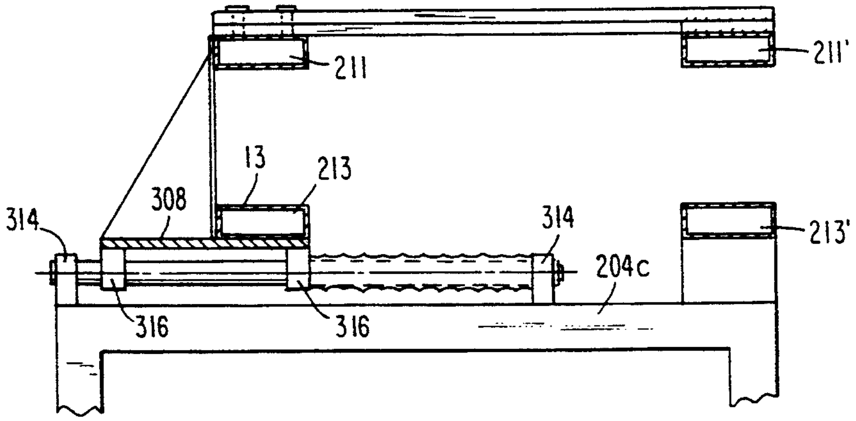
Figure 7A:
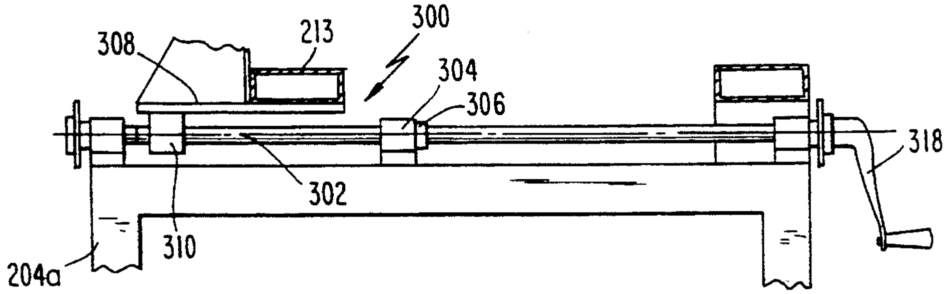

The adjustable upper and lower left hand frame members 211,213 are connected together at their ends as mentioned above and are capable of transverse sliding movement as a unit by means of adjustable side screw drives 300 located at longitudinally spaced intervals on the fixed immovable bases 204. As depicted in FIG. 7A, each adjustable side screw drive 300 comprises a threaded screw 302 mounted to the upper braces 204*c* of the respective base members 204 with journal bearings 304 and set collars 306. The adjustable frame members 211,213 are interconnected to the screws through supporting base plates 308 mounted to threaded driven blocks 310 threadedly secured to the screws 302. A slider guide bar 312 (FIGS. 7B and 7C) is mounted to the brace 204*c* adjacent each threaded screw 302 and is supported between a pair of mounting collars 314. A pair of slide blocks 316 attached to the support plate 308 enables smooth sliding movement of the adjustable frame members 211,213 to occur in response to rotation of the threaded screws 302, either manually with adjustment handle 318 or via motor drive (not shown).

The left and right hand frames 211,213 and 211′,213′ provide support for the web feed and close-up conveyor comprising left and right longitudinally extending support rails 220 and 222 pivotally and respectively secured, at upstream ends thereof (FIG. 10) to the lower frame members 213,213′, with shafts extending through these frame members and the rails and fixed thereto with mounting blocks 215*a* and set collars 215*b*. These shafts 215 are coaxial to define a transversely extending pivot axis P about which the web feed and close-up conveyor pivots (FIG. 1B) when the height of the rails 220,222, relative to vertically immovable frame members 213,213′ is adjusted with jactuators 320 engaging the downstream ends of the support rails. As best depicted in FIGS 1B and 9, the pair of jactuators 320 is respectively mounted to project upwardly from fixed frame members 206 to contact, and elevationally displace, a support plate 322 to which the support rails 220,222 are connected at their downstreammost upper ends 220′,222′, to support brackets 324 mounted to the plate 322.

As best depicted in FIGS. 9 and 9A, the upper ends 220′,222′ of the support rails 220,222 are further respectively interconnected to frame members 213,213′, with transversely extending shafts 326 having outer ends mounted to upper surfaces of members 213,213′ with mounting blocks 328. The inner ends of shafts 326 extend through a vertically elongate slot 330 formed in spacer and web guide brackets 332 and are captivated therewithin as well as the interior of the support rails with a pair of washers 334 engaging outer surfaces of the vertical slots 334 and retained thereagainst with nuts 336. With this arrangement, the interconnection of pivotal frames 220,222 to transversely movable frame 213 and fixed frame 213′, i.e., relative vertical movement of the shafts 326 through the slots 330, advantageously allows the web conveyor support frame 220,222 to pivot and thereby effect elevational adjustment (to accommodate manufacture of I-beams of different thickness) of the web conveyor independent of transverse adjustment of frame 211,213 (to manufacture I-beams of different height).

As mentioned above, the pivotal web frames 220,222 support the web feed and close-up conveyor upon which the web members 14 are conveyed between the pair of chords 13*a*,13*b*. As best depicted in FIG. 13, each frame member 220,222 supports a plurality of rolls 221, rotatable about horizontal axes, each mounted at longitudinally spaced intervals with a horizontal shaft 221′ extending between upright arms 221*a* of a U-shaped mounted bracket 221*b* secured to the top surfaces of each frame. As best depicted in FIG. 1A, the rolls 221 are mounted at alternating locations to their associated frame 220 or 222 to enable adjacent rolls to mesh with each other when the frame 220 is moved via adjustable frame 213 towards frame 222 (FIG. 13A) to manufacture beams of narrow height. At the upstream location depicted in FIGS. 5 and 13, longitudinally extending web guides 400 are secured to an outer bracket arm 402 connected to rails 220,222 to contact longitudinal edges 21 of the web members 14 in centering engagement.

Figure 3:
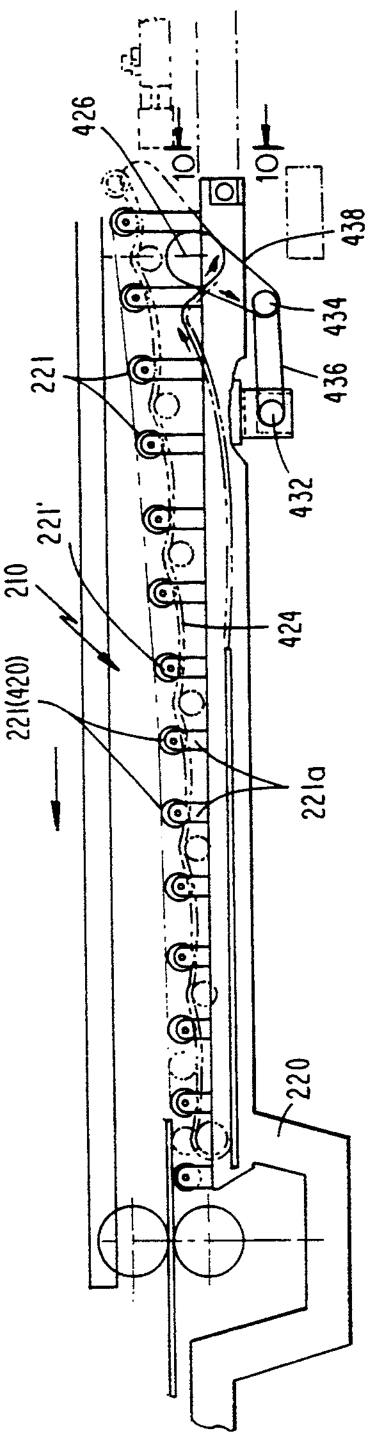
FIG. 3 is a sectional view taken along the line 3—3 of FIG. 1A depicting various features of the web close-up and feed drive system.
Figure 4:
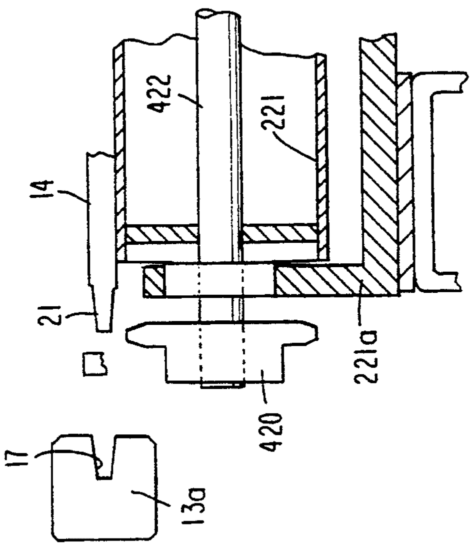
FIG. 4 is a sectional view taken along the line 4—4 of FIG. 1A depicting additional features of the web driven rolls.
Figure 2:
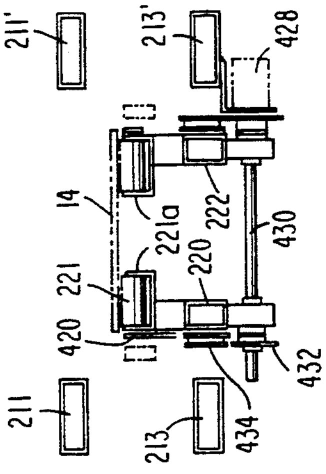
FIG. 2 is a sectional view taken along the line 2—2 of FIG. 1B depicting various features of the web drive system.

FIGS. 2–5 are illustrations of the bottom drive system for the web feed and close-up conveyor. As best depicted in FIGS. 2, 4 and 13, each roll 221 is driven through a sprocket 420 mounted at the outer end of the associated shaft 221′0 in meshing contact with a chain 424 arranged in a serpentine path around the sprockets 420 (FIG. 3). The chain 424 is driven by a drive sprocket 426 in turn driven with a hydraulic motor 428 having a splined output shaft 430 (FIG. 2), driven sprockets 432 mounted to opposite ends of the shaft, intermediate double sprockets 434 mounted to frames 220,222, and chains 436 and 438 respectively trained around the groups of sprockets 432,434 and 434,426. As is apparent from FIG. 2, the splined shaft 430 enables the associated driven sprocket 432 arrangements to be slidable along the shaft upon transverse sliding movement of rail 220 as a result of transverse adjustment of left hand frame 211,213 to adjust for beam height as described above.

The web members 14 entering the assembly machine 10 from the web feeder driven rolls 25 are successively conveyed on rolls 221 between the chords 13*a*,13*b* by the web feed and close-up conveyor, with the web guides 400 being contactable with the longitudinal web edges 21 to provide centering. As the chords 13*a*, 13*b* converge towards the web longitudinal edges at downstream locations within the machine 10, via idler rollers 450 rotatable about vertical axes and mounted in brackets 452 attached to vertical straps secured to frames 220,222, two pairs of top and bottom web guides 455 and 460 positively contact upper and lower surfaces of the web train to ensure proper registration with the grooves 17 in the chord members 13*a*,13*b*. As depicted in FIG. 14, the left and right bottom left guides 460 are secured to rails 220,222 with U-shaped mounting channels 462 and retaining pins 464. The top web guides 455 are secured to rails 220,222 with brackets 465 and additional U-shaped mounting channels 462 and retaining pins 464.

FIG. 8 is an illustration of a flange drive and hold-down 500 comprising a pair of tandem flange drive traction rolls 502 and 504 (FIG. 1B) mounted to a lower support frame with pillow block bearings 506 and a flange drive motor 508 imparting drive to each roll through a chain 510 connected to a double sprocket 512 mounted to the upstream roll. A second chain interconnects the chain drive from the double sprocket to a single sprocket on the downstream roll. Overhead flanged guide wheels 515 mounted to cylinders 517 via brackets 519 contact the top surfaces of each chord to ensure positive traction with the bottom flange drive rolls 502,504. Like flange hold-down roll assemblies 515 are disposed throughout the assembly machine 10 at longitudinally spaced intervals to maintain each chord or flange 13*a*,13*b* in spaced relation to the longitudinal web edges 21 during conveyance through the machine. As depicted in FIG. 13, there are also provided bottom flanged guide wheels 520 which are idlers secured to the web support rails 220,222 with brackets (not shown in detail)for proper vertical alignment with the cylinder operated hold down rolls 515.

The web members 14 successively conveyed along the conveyor are advanced with the chain driven rolls 221 discussed above towards the downstream web drive and hold-down rolls 600 depicted in FIG. 11 which operates at a slower speed than the web bottom driven rolls 221 discussed above to allow the individual web members 14 to close up to form a continuous web. Therein, a set of bottom drive wheels 602 (preferably carbide sprayed or serrated for improved traction) are mounted via shafts 604 to bottom rails 213,213'. The shafts 604 are respectively rotatably supported on the frame members 213,213' with bearings 606. Outermost ends of the shafts 604 protruding from the bearings carry sprockets 608 driven by a lower set of sprockets 610 mounted to a splined shaft 612 to allow for movement of the adjustable frame 213 for varying beam depth. These bottom sprockets 610 are in turn driven with a web drive motor 614. The bottom drive wheels 602 are replaced with other drive wheels of varying diameter to allow for changes in beam depth via pivotable movement of the support rails 220,222 and the web bottom drive system to ensure that the drive wheels 602 convey the webs at the same elevational position as the web drive system. The hold-down wheels 620 are mounted to the top rails 211,211' with shafts 622 and journalled bearings 624 as also depicted in FIG. 11. Air cylinders 626 are utilized to press the hold down wheels 620 against the top surface of the web members 14.

In a different embodiment, it will be appreciated that the web drive and hold down system may be mounted directly to the web drive support rails 220,222 so as to move correspondingly with the web bottom drive rolls 221 upon actuation of the web height jactuators 320 depicted in FIG. 1B.

FIG. 12 is an illustration of the beam retard and hold down system 700 comprising a beam drive roll 702 journalled in bearings 704 mounted to one of base members 204. The beam drive 700 is directly driven with a hydraulic motor 706 secured to the base member 204 with a vertical support plate 708. The juxtaposed downstream ends 214 of frame members 211,213 and 211',213' respectively support flanged hold-down wheels 710 connected to the pistons of air cylinders 712 mounted to the frame members with a clevis and pin arrangement 714. A guide base 716 and guide shoe 718 arrangement supports the vertically movable flanged wheels 710 to enable the wheels to contact top surfaces of the flanges 13*a*,13*b* of the beam.

The web bottom drive 221 constitutes an important feature of the present invention by allowing for improved overhead access to the webs 14 and by enabling the webs to abut each other to form a continuous web.

As further depicted in FIG. 15, the web bottom drive introduces the webs 14 into the assembly machine 10 along a gently downwardly inclined path of conveyance defined by the bottom driven rolls 221 mounted to vertical mounting straps of progressively greater height in the upstream direction as best depicted in FIG. 3. This arrangement enables in-line cutting of the grooves 17 within the chords 13 with cutter heads 100 (depicted in FIG. 6) positioned beneath the web conveyor. Instead of web driven rolls, the portion of the web conveyor located above and coextensive with the cutter heads 100 is formed with lift out roller sections 730 (FIG. 15*a*) rotatable about horizontal axes for improved access to the cutter heads.

JOINING THE WEBS AND FLANGES TO FORM THE WOODER I-BEAM

As discussed above, the web members 14 are sequentially fed from the web infeed driven rolls 25 into contact with the bottom driven rolls 221 of the web feed and close-up conveyor, eventually reaching the web drive and hold down arrangement 602 of FIG. 11 where the constant faster drive from the upstream driven rolls 221 in relation to the downstream web drive and hold-down 602 causes the successively conveyed webs to abut one another to form a continuous web train. The webs are maintained in proper alignment with the web guides of FIG. 13 contactable with the longitudinal web edges 21 and thereafter with the top and bottom web guides 455,460 of FIG. 14 contacting top and bottom surfaces of the web members in the downstream area where the chords are Joined to the webs.

As mentioned above, the chords are fed along opposite sides of the continuous web and maintained in spaced relation to the web edges by the hold down and guide rolls 515,520 with the constant drive from the rear flange drive and hold-down system 509- of FIG. 8 providing the driving force to the flanges. The flange or chord members 13*a*,13*b* are fed from right to left in FIG. 1A and between the converging chord guide rollers 450 where they are pressed into contact by the converging chord idler rollers 450 rotatable about vertical axes which idler pairs of rollers progressively force the chords towards the web members so that the longitudinal edges of the web members enter into the chord grooves. Further pairs of squeeze rollers 450 rotatable about vertical axes are positioned along opposite sides of the chords now joined to the webs for maintaining the united webs and chords in joined relationship as the I-beam advances through the chords and webs assembly line. These squeeze roller sets for effecting this general type of chord converging and pressing assembly operation are well known in the trade.

Figure 1C:
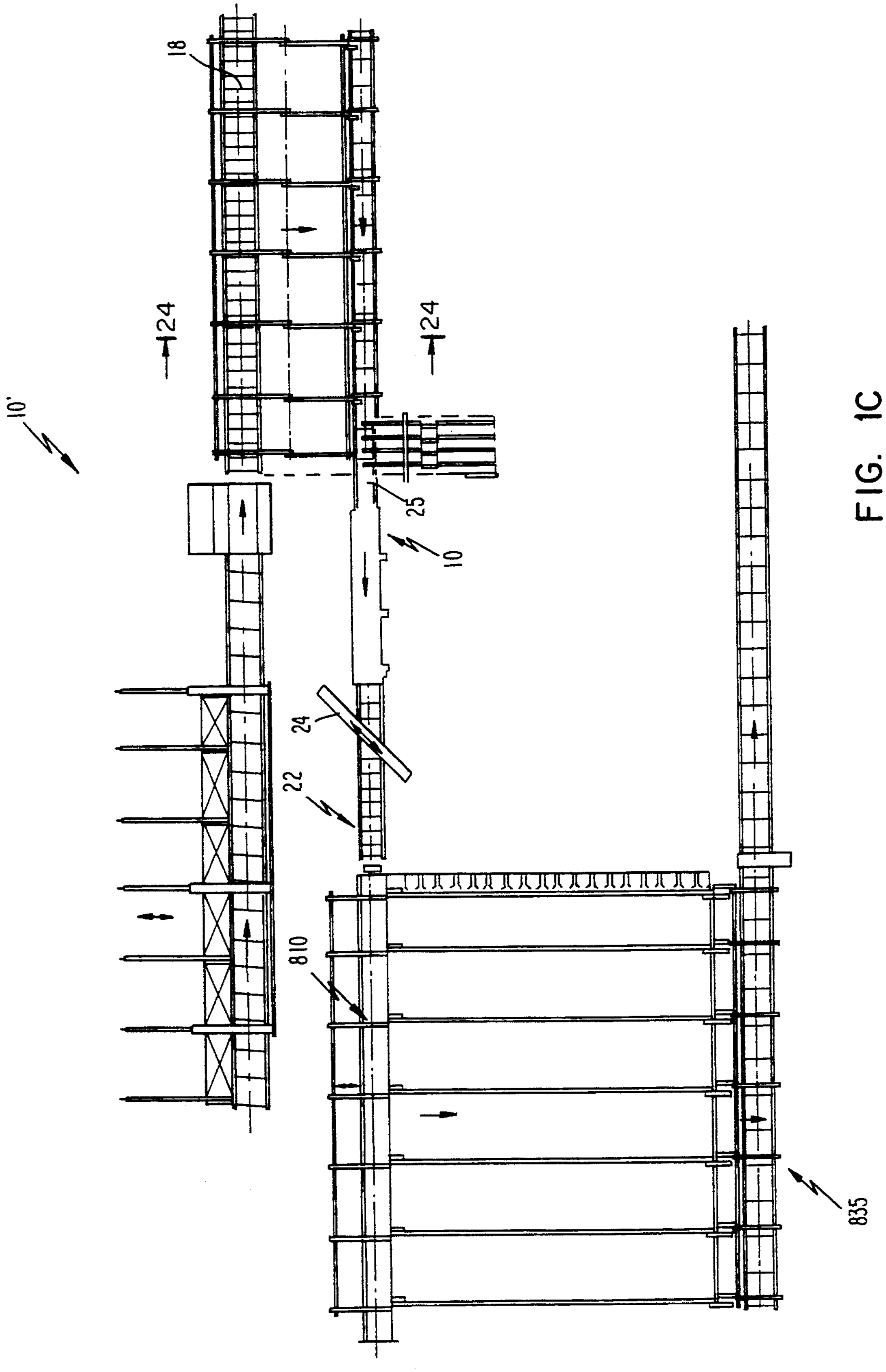
FIG. 1C is a schematic plan view of an overall production line assembly for manufacturing wooden I-beam.

After the webs and chords are joined together to form the wooden I-beam, the resulting beam is driven through the assembly line with the beam retard and hold-down drive 700 of FIG. 12 as discussed above. As depicted in FIGS. 1C and 19, the cut beams are then conveyed to an I-joist side shift/stacker of known construction wherein a schematically depicted fork drive 800 transfers each beam to a laterally extending conveyor 810 successively conveying each beam onto a vertical hoist arm 820 which incrementally lowers until a stack 830 of I-joist beams is deposited onto an I-joist surge and curing transfer conveyor 840. In FIG. 19, the stacks 830 of I-joists are conveyed along the conveyor to a nester and bundle outfeed conveyor 838 as well known in the art. The transfer conveyor 840 is timed to provide a minimum cure dwell time in which the glue joints in each I-beam cure to a predetermined extent. The minimum cure dwell time is controlled by extending the length of the transfer conveyor 840 to provide the necessary dwell time. The transfer conveyor 840 of FIG. 19 is conventional and tends to occupy considerable floor space.

In accordance with the present invention, there is provided a wicket curing tower 900 replacing the hoist arm 820 and transfer conveyor 840 of FIG. 19 by receiving individual cut beams from the transfer conveyor 810 disposed downstream from the flying cutoff saw 22. As depicted in FIG. 17, the wicket curing tower 900 comprises a pair of vertically spaced support members 902 each having sprockets at opposite ends thereof respectively supporting a pair of chains 904,906. Correspondingly located chain links 908 in turn support a pair of transfer arms 910 of sufficient length to define a transfer slot 912 therebetween dimensioned to substantially entirely receive individual I-beams within the slot. The I-beams are sequentially indexed with a pair or more of side shifter lugs 914 carried on a lateral conveyor 916 schematically depicted in FIG. 17 adapted to engage an individual I-beam along one of the chords thereof to transfer the I-beam from an assembly outfeed pan 918 into one of the slots 912 located co-elevationally with the pan. In this manner, continual indexed movement in the resulting wicket curing tower 900 enables successive cut I-beams to be sequentially and continuously transferred into successively indexed transfer slots 912. The curing time is provided by the residence of the cut I-beam within its slot 912 as the I-beam moves from the infeed location at 918, vertically upwardly along the upstream run of the curing tower, over the top roll 902 and then vertically downwardly along the downstream run of the curing tower. As the individual slots 912 pass below the horizontal plane of the bottom roll 902, whereupon each slot extends downwardly in the direction of its open end, a curved retaining plate 920 prevents the beam from inadvertently dropping from the slot 912 until the slot travels past the lowermost end 922 of the plate where there is defined a gap 924 between the lowermost edge of the retaining plate and a surface of a pivotal pusher 926. When aligned with the gap 924, the cut I-beam drops by gravity onto and against the pusher 926 which is indexed with a cylinder 928 to move the cut beam onto a nester 930 for nesting engagement with other cut beams previously discharged from the wicket curing tower 900. Periodically, a stack of nested beams is transferred via a forklift 940 to an outfeed conveyor 950 where the I-joists may be bundled for shipment.

The feature of a vertically extending wicket curing tower 900 advantageously provides a minimum cure dwell time to enable the glued Joints of the I-beam to cure to a sufficient extent while occupying minimal floor space.

An alternative embodiment of an I-Joist surge and cure wicket tower is depicted in FIG. 18 wherein plural top rolls 952 and bottom rolls 954 essentially extend the path of surge and curing transfer conveyance while continuing to utilize minimal floor space. However, instead of employing gravity feed at the outfeed end of the wicket curing tower, a horizontally and laterally extending I-joist outfeed conveyor 955 is disposed between the pair of transfer arm assemblies. As the transfer arm assemblies carrying an I-beam descend to the horizontal discharge location, the I-beam rests on the I-joist outfeed conveyor 955 which is then actuated to convey the I-beam from the tower to an I-joist turner and nester 960 for delivery to a bundle shuttle and the bundle outfeed roll case. The I-joist turner and nester, bundle shuttle and roll case are structures which are known in the art.

In view of the foregoing description of the preferred embodiment, it will be realized that numerous advantages are achieved with the present invention. For example, the feature of flange feeding with a cam type flange feeder 70 and flexible hold-down 84 advantageously enables grooved and ungrooved flanges to be fed into the assembly machine 10 without requiring manual surveillance or positioning of the individual flanges along the left and right hand sides of the flange infeed roll cases. The mechanism for handling and feeding pre-grooved flanges into the assembly machine while maintaining the proper orientation of the grooves is particularly useful by eliminating the presence of manual personnel to orient the flanges (particularly square flanges) by hand.

Seating of the stacked web members or individual webs along a laterally extending web transfer conveyor and a lugged web singulator conveyor wherein the lugs engage the lengthwise edge of the web to convey same down the wheel ramp onto the web feeder driven rolls 25 enables any length or width of web to be fed into the assembly machine. This enables the use of random length webs in the manufacture of wooden I-beams, including webs having a length corresponding to the full length of the beam.

The feature of a web run-up system within the assembly machine wherein the webs are driven by a unique bottom drive arrangement engaging the web bottom surfaces ensures that the web members are both positively driven through the machine and into abutting contact with each other so as to form a continuous web train without gaps weakening the product. The web bottom drive also provides for easy overhead access to the web train, flanges and formed wooden I-beam in the assembly machine during the assembly process. The manner of adjusting the height of the web train with the web support rails pivotally mounted to the left and right hand support frames and the feature of enabling the left hand side of the pivotal web support rail to be transversely adjustable by means of the adjustable left hand support frame to accommodate manufacture of I-beams of different height is also considered unique.

Allowing the cut I-beams to be conveyed within a wicket curing tower affords the glued joints of the I-beam additional cure time to result in a stronger product while taking optimal advantage of the existing production floor space.

It will be recognized that while the various foregoing advantages are optimal either individually or in combination, the benefits of the invention may still be realized by parting from one or more of such features within the scope of the dependent claims.

The present invention may be embodiment in other specific forms without departing from spirit or essential characteristics thereof. The present embodiments are presented merely as illustrative and not restrictive, with the scope of the invention being indicated by the attached claims rather than the foregoing description. All advantages which come within the meaning and range of equivalency of the claims are therefore intended to be embraced therein.

I claim:

1. A production line assembly for manufacturing a wooden I-beam from a pair of elongated wooden chord members each having a longitudinal groove formed in one of the faces of the chord and planar wooden web members having opposite longitudinal edges, comprising:

(a) a chords and webs assembly machine including an assembly machine frame and a web conveyor arrangement connected to said assembly machine frame for conveying said web members in end-to-end relationship as a continuous web;

(b) a driving arrangement connected to said frame for driving a pair of said chords respectively along opposite sides of the continuous web with longitudinal grooves of said chords facing said web;

(c) a directing arrangement connected to said frame for directing said pair of chords towards said continuous web so that opposite sides of said web are respectively inserted into the grooves of said chords to form an interconnecting joint therebetween and thereby said wooden I-beam; and (d) a beam driving arrangement connected to said frame for driving said wooden I-beam out of said assembly machine to effect cutting of the I-beam into a desired length;

and further including a chord feeding arrangement for feeding a pair of chords to a pair of chord infeed locations respectively disposed at an entrance end of the assembly machine along said opposite sides, said chord feeding arrangement including:

(i) a pair of chutes respectively disposed at left and right hand sides of the entrance end of the assembly machine;

(ii) a cam type flange feeder and a resiliently mounted hold-down jointly defining an inlet to the chute;

(iii) conveyor means for conveying said chords to each inlet;

(iv) means for rotating the cam type flange feeder to enable a pushing surface of each cam to engage a trailing lengthwise surface of the endmost chord on the cam and thereby simultaneously direct two or more said chords into the chute against resilient yielding movement of the hold-down, wherein said pushing surface, prior to rotation, is spaced a distance from said chute which is greater than twice the chord thickness to push said two or more chords into said chute.

2. A production line assembly for manufacturing a wooden I-beam from a pair of elongated wooden chord members each having a longitudinal groove formed in one of the faces of the chord and planar wooden web members having opposite longitudinal edges, comprising:

(a) a chords and webs assembly machine including an assembly machine frame and a web conveyor arrangement connected to said assembly machine frame for conveying said web members in end-to-end relationship as a continuous web;

(b) a driving arrangement connected to said frame for driving a pair of said chords respectively along opposite sides of the continuous web with longitudinal grooves of said chords facing said web;

(c) a directing arrangement connected to said frame for directing said pair of chords towards said continuous web so that opposite sides of said web are respectively inserted into the grooves of said chords to from an interconnecting joint therebetween and thereby said wooden I-beam; and (d) a beam driving arrangement connected to said frame for driving said wooden I-beam out of said assembly machine to effect cutting of the I-beam into a desired length;

and further including a chord feeding arrangement for feeding a pair of chords to a pair of chord infeed locations respectively disposed at an entrance end of the assembly machine along said opposite sides, said chord feeding arrangement including:

(i) a pair of chutes respectively disposed at left and right hand sides of the entrance end of the assembly machine;

(ii) a cam type flange feeder and a resiliently mounted hold-down jointly defining an inlet to the chute;

(iii) conveyor means including a slide ramp for conveying said chords to each inlet;

(v) means for rotating the cam type flange feeder to enable a phasing surface of each cam to engage a trailing lengthwise surface of the endmost chord on the cam and thereby simultaneously direct said chord into the chute against resilient yielding movement of the hold-down, wherein each cam has a first arcuate cam surface and a larger second arcuate cam surface separated from each other by said pushing surface which extends radially to successively contact said chords being transferred on said conveyor means, said first surface being normally disposed below said slide ramp along which the chords move from the conveyor means to each said inlet.

3. The production line of claim 2, wherein the upper end of each hold-down and the first surface of the associated cam define said inlet which is a gap smaller than the height of the chord to normally prevent the chord from entering the chute, said hold-down being squeezed as the chords pass said inlet.

4. The production line of claim 3, wherein said second surface is arranged to ascend upwardly into the ramp and then move through the chute with and trailing the pushing surface during cam rotation, whereby said second surface prevents other chords from entering the chute and, as said second surface descends below the upper end of the hold-down, said hold-down resiliently restores itself outwardly to its undefected position to prevent said other chords from entering the chute.

5. The production line of claim 4, wherein said chords are ungrooved at the time of conveyance to the chutes, and further including cutting head means disposed downstream from the chord infeed locations within the assembly machine for grooving said chords as they move through the machine.

6. A production line assembly for manufacturing a wooden I-beam from a pair of elongated wooden chord members each having a longitudinal groove formed in one of the faces of the chord and planar wooden web members having opposite longitudinal edges, comprising:

(a) a chords and webs assembly machine including an assembly machine frame and a web conveyor arrangement connected to said assembly machine frame for conveying said web members in end-to-end relationship as a continuous web;

(b) a driving arrangement connected to said frame for driving a pair of said chords respectively along opposite sides of the continuous web with longitudinal grooves of said chords facing said web;

(c) a directing arrangement connected to said frame for directing said pair of chords towards said continuous web so that opposite sides of said web are respectively inserted into the grooves of said chords to form an interconnecting joint therebetween and thereby said wooden I-beam; and (d) a beam driving arrangement connected to said frame for driving said wooden I-beam out of said assembly machine to effect cutting of the I-beam into a desired length;

and further including a chord feeding arrangement for feeding a pair of chords to a pair of chord infeed locations respectively disposed at an entrance end of the assembly machine along said opposite sides, said chord feeding arrangement including:

(i) a pair of chutes respectively disposed at left and right hand sides of the entrance end of the assembly machine;

(ii) a cam type flange feeder and a resiliently mounted hold-down jointly defining an inlet to the chute;

(iii) conveyor means for conveying said chords to each inlet;

(iv) means for rotating the cam type flange feeder to enable a pushing surface of each cam to engage a trailing lengthwise surface of the endmost chord on the cam and thereby direct said chord into the chute against resilient yielding movement of the hold-down, wherein said chords are pre-grooved and moved along the conveyor means with their grooved surface facing upwardly, wherein the cam type flange feeder associated with the near chute associated with one side of the machine closer to the conveyor means has a first arcuate cam surface and a larger second arcuate cam surface separated from each other by a radially extending said pushing surface, said first surface being normally disposed below a slide ramp along which the chords move from the conveyor means to the inlet of the near chute, wherein the upper end of the hold-down associated with the near chute and the first surface of said cam define the inlet which is a gap smaller than the height of the chord to normally prevent the chord from entering the near chute; and wherein the far chute located on the farther side of the machine to which the chords are conveyed to the chute along a ramp extending in part above and over the near chute includes a second hold-down pivotally mounted to move between a raised position and a lower position and a second cam type flange feeder mounted downstream from and in spaced relation to the second hold-down to define therewith the inlet to the far chute, wherein in the lower position the second hold-down is disposed below the ramp to enable the chords to slide thereover onto an accumulating surface of the second cam which accumulating surface terminates in the pushing surface of the second cam and in the raised position of said second hold-down the flow of chords along the ramp towards the accumulating surface is disrupted by the hold-down, said second hold-down in the raised position having an upper end defining the inlet to the far chute together with the accumulating surface of the cam which inlet is a gap less than the height of the chords to normally prevent the chords from entering the far chute, whereby timed rotation of the second cam in a counter-rotating direction relative to the first cam causes the pushing surface of the second cam to direct the chords on the accumulating surface into the far chute with the groove surfaces facing inwardly.

7. A production line assembly for manufacturing a wooden I-beam from a pair of elongated wooden chord members each having a longitudinal groove formed in one of the faces of the chord and planar wooden web members having opposite longitudinal edges, comprising:

(a) a chords and webs assembly machine including an assembly machine frame and a web conveyor arrangement connected to said assembly machine frame for conveying said web members in end-to-end relationship as a continuous web;

(b) a chord driving arrangement connected to said frame for driving a pair of said chords respectively along opposite sides of the continuous web with longitudinal grooves of said chords facing said web;

(c) a directing arrangement connected to said frame for directing said pair of chords towards said continuous web so that opposite sides of said web are respectively inserted into the grooves of said chords to form an interconnecting joint there between and thereby said wooden I-beam; and (d) a beam driving arrangement connected to said frame for driving said wooden I-beam out of said assembly machine to effect cutting of the I-beam into a desired length;

and further including means for feeding said webs into the assembly machine, said web feeding means including:

(i) web infeed roll case means in line with the entrance and to the assembly machine and extending longitudinally and substantially coaxial with the chords and webs assembly path;

(ii) laterally extending web infeed conveyor means arranged to receive a stack of web members extending with their longitudinal axes perpendicular to the lateral path of conveyance of the infeed conveyor means;

(iii) laterally extending staging conveyor means arranged to receive said stack from the infeed conveyor means; and (iv) laterally extending lugged conveyor means arranged to receive said stack from the staging conveyor means, said lugged conveyor means including a plurality of lugs arranged to engage a lengthwise edge of a web thereon to convey same towards the web infeed roll case means; whereby lug engagement of said lengthwise edge enables webs of the same or random length to be fed into the assembly machine in a continuous and uninterrupted manner without adjusting the assembly machine or the web feeding means.

8. A production line assembly for manufacturing a wooden I-beam from a pair of elongated wooden chord members each having a longitudinal groove formed in one of the faces of the chord and planar wooden web members having opposite longitudinal edges, comprising:

(a) a chords and webs assembly machine including an assembly machine frame and a web conveyor arrangement connected to said assembly machine frame for conveying said web members in end-to-end relationship as a continuous web;

(b) a chord driving arrangement connected to said frame for driving a pair of said chords respectively along opposite sides of the continuous web with longitudinal grooves of said chords facing said web;

(c) a chord directing arrangement connected to said frame for directing said pair of chords towards said continuous web so that opposite sides of said web are respectively inserted into the grooves of said chords to form an interconnecting joint therebetween and thereby said wooden I-beam; and (d) a beam driving arrangement for driving said wooden I-beam out of said assembly machine to effect cutting of the I-beam into a desired length;

wherein a web conveyor arrangement within the assembly machine is a web bottom drive including:

(i) a pair of longitudinally extending web drive support rails respectively pivotally connected at their upstream ends to a pair of the left and right hand machine frames of the assembly machine;

(ii) web driven rolls mounted to said support rails and engageable with the undersides of the web members to define a path of conveyance for the webs between the chords;

(iii) means for rotating the web driving rolls, said rotating means being located below the path of conveyance; and (iv) means connecting to the downstream ends of the rails for raising and lowering the rails relative to the pivot axis to thereby adjust the elevation of the web train to be co-elevational with the grooves in the chords.

9. The production line of claim 8, wherein each left and right hand frame includes a pair of longitudinally extending frame members connected together at opposite ends thereof, and a plurality of longitudinally spaced immovable bases for supporting the left and right hand frames and thereby the assembly machine, and means for adjustably supporting the left hand frame on the immovable bases to enable lateral sliding adjustment of the left hand frame towards and away from the right hand frame to correspondingly displace the flange drive and hold-down members and thereby the left hand flanges relative to the right hand flanges to accommodate manufacture of I-beams of different height, said adjusting means including a series of said screws and slide shafts mounted on the immovable bases in the transverse direction and threaded driven blocks mounted to the left hand frame members to impart said transverse movement to the left hand frame upon rotation of the side screws.

10. The production line of claim 9, wherein said downstream ends of the web drive support rails are connected to the left and right hand frames through slotted and pinned connections to thereby enable corresponding lateral adjustment of the left hand web support rail upon corresponding movement of the left hand frame independent of raising and lowering movement of the web drive support rails whereby the pinned connections of the web drive support rails are free to move through the slots in the left and right hand frames.

11. A production line assembly for manufacturing a wooden I-beam from a pair of elongated wooden chord members each having a longitudinal groove formed in one of the faces of the chord and planar wooden web members having opposite longitudinal edges, comprising:

(a) a chords and webs assembly machine including an assembly machine frame and a web conveyor arrangement connected to said assembly machine frame for conveying said web members in end-to-end relationship as a continuous web;

(b) a chord driving arrangement for driving a pair of said chords respectively along opposite sides of the continuous web with longitudinal grooves of said chords facing said web;

(c) a chord directing arrangement for directing said pair of chords towards said continuous web so that opposite sides of said web are respectively inserted into the grooves of said chords to form an interconnecting joint therebetweeen and thereby said wooden I-beam; and (d) a beam driving arrangement for driving said wooden I-beam out of said assembly machine to effect cutting of the I-beam into a desired length;

and further including a wicket curing tower located downstream from the assembly machine, said wicket curing tower including a vertically extending conveyor having a series of slots or racks adapted to successively received cut wooden I-beams so as to convey said beams upwardly along the upstream run of the conveyor, over the top and downwardly along the downstream run for discharge to a bundling location, said wicket curing tower thereby enabling the cut I-beams to have a minimum cure dwell time to facilitate curing of the glued joints between the chords and webs, and further including a nesting means at said bundling location for receiving cured beams from said tower and grouping said beams in an interleaved arrangement such that the chords of adjacent beams are alternately nested and stacked on each other.

12. A chords and webs assembly machine and frame therefor for manufacturing a wooden I-beam from a pair of elongated wooden chord members each having a longitudinal groove formed in one of the faces of the chord and planar wooden web members having opposite longitudinal edges, comprising:

(a) a web conveyor arrangement connected to the frame for conveying said web members in end-to-end relationship as a continuous web;

(c) a guiding arrangement connected to the frame for guiding a pair of said chords respectively along opposite sides of the continuous web with longitudinal grooves of said chords facing said web;

(c) a directing arrangement connected to the frame for directing said pair of chord towards said continuous web so that opposite sides of said web are respectively inserted into the grooves of said chords to form an interconnecting joint therebetween and thereby said wooden I-beam; and (d) a beam driving arrangement connected to the frame for driving said wooden I-beam out of said assembly machine to effect cutting of the I-beam into a desired length;

wherein said web conveyor arrangement within the assembly machine is a web bottom drive including:

(i) a pair of longitudinally extending web drive support rails respectively pivotally connected at their upstream ends to a pair of the left and right hand machine frames of the assembly machine;

(ii) web driven rolls mounted to said support rails and engageable with the undersides of the web members to define a path of conveyance for the webs between the chords;

(iii) a web driven roll driving arrangement connected for rotating the web driven rolls, said web driven roll driving arrangement being located below the path of conveyance; and (iv) an adjusting arrangement connecting to the downstream ends of the rails for raising and lowering the rails relative to the pivot axis to thereby adjust the elevation of the web train to be co-elevational with the grooves in the chords.

13. The machine of claim 12, wherein each left and right hand frame includes a pair of longitudinally extending frame members connected together at opposite ends thereof, and a plurality of longitudinally spaced immovable bases for supporting the left and right hand frames and thereby the assembly machine, and means for adjustably supporting the left hand frame on the immovable bases to enable lateral sliding adjustment of the left hand frame towards and away from the right and frame to correspondingly displace the flange drive and hold-down members and thereby the left hand flanges relative to the right hand flanges to accommodate manufacture of I-beams of different height, said adjusting means including a series of side screws and slide shafts mounted on the immovable bases in the transverse direction and threaded driven blocks mounted to the left hand frame members to impart said transverse movement to the left hand frame upon rotation of the side screws.

14. The machine of claim 12, wherein said downstream ends of the web drive support rails are connected to the left and right hand frames through slotted and pinned connections to thereby enable corresponding lateral adjustment of the left hand web support rail upon corresponding movement of the left hand frame independent of raising and lowering movement of the web drive support rails whereby the pinned connections of the web drive support rails are free to move through the slots in the left and right hand frames.

15. A flange feeder for feeding a pair of chords to a pair of chord infeed locations respectively disposed at an entrance end of a wooden I-beam assembly machine, said chord feeding machine comprising:

(a) a pair of chutes respectively disposed at left and right hand sides of the entrance end of the assembly machine;

(b) a cam type flange feeder and a resiliently mounted hold-down jointly defining an inlet to the chute;

(c) a conveyor for conveying said chords to each inlet;

(d) means for rotating the cam type flange feeder to enable a pushing surface of each cam to engage a trailing lengthwise surface of the endmost chord on the cam and thereby simultaneously direct two or more said chords into the chute against resilient yielding movement of the hold-down, wherein said pushing surface, prior to rotation, is spaced a distance from said chute which is greater than twice the chord thickness to thereby simultaneously push two or more chords into said chute.

16. A flange feeder for feeding a pair of chords to a pair of chord infeed locations respectively disposed at an entrance end of a wooden I-beam assembly machine, said chord feeding machine comprising:

(a) a pair of chutes respectively disposed at left and right hand sides of the entrance end of the assembly machine;

(b) a cam type flange feeder and a resiliently mounted hold-down jointly defining an inlet to the chute;

(c) a conveyor for conveying said chords to each inlet;

(d) means for rotating the cam type flange feeder to enable a pushing surface of each cam to engage a trailing lengthwise surface of the endmost chord on the cam and thereby simultaneously direct one r more said chords into the chute against resilient yielding movement of the hold-down, wherein each cam has a first arcuate cam surface and a larger second arcuate cam surface separated from each other by said pushing surface which extends radially to successively contact said chords being transferred on said conveyor means, and further including a slide ramp along which the chords move from the conveying means to each said inlet, said first surface being normally disposed below said slide ramp.

17. The flange feeder of claim 16, wherein the upper end of each hold-down and the first surface of the associated cam define said inlet which is a gap smaller than the height of the chord to normally prevent the chord from entering the chute, said hold-down being squeezed as the chords pass said inlet.

18. The flange feeder of claim 17, wherein said second surface is arranged to ascend upwardly into the ramp and then move through the chute with and trailing the pushing surface during cam rotation, whereby said second surface prevents other chords from entering the chute and, as said second surface descends below the upper end of the hold-down, said hold-down resiliently restores itself outwardly to its undeflected position to prevent said other chords from entering the chute.

19. The flange feeder of claim 18, wherein said chords are ungrooved at the time of conveyance to the chutes, and further including cutting head means disposed downstream from the chord infeed locations within the assembly machine for grooving said chords as they move through the machine.

20. A flange feeder for feeding a pair of chords to a pair of chord infeed locations respectively disposed at an entrance end of a wooden I-beam assembly machine, said chord feeding machine comprising:

(a) a pair of chutes respectively disposed at left and right hand sides of the entrance end of the assembly machine;

(b) a cam type flange feeder and a resiliently mounted hold-down jointly defining an inlet to the chute;

(c) a conveyor for conveying said chords to each inlet;

(d) means for rotating the cam type flange feeder to enable a pushing surface of each cam to engage a trailing lengthwise surface of the endmost chord on the cam and thereby simultaneously direct one or more said chords into the chute against resilient yielding movement of the hold-down, wherein each left and right hand frame includes a pair of longitudinally extending frame members connected together at opposite ends thereof, and a plurality of longitudinally spaced immovable bases for supporting the left and right hand frames and thereby the assembly machine, and means for adjustably supporting the left hand frame on the immovable bases to enable lateral sliding adjustment of the left hand frame towards and away from the right hand frame to correspondingly displace the flange drive and hold-down members and thereby the left hand flanges relative to the right hand flanges to accommodate manufacture of I-beams of different height, said adjusting means including a series of side screws and slide shafts mounted on the immovable bases in the transverse direction and threaded driven blocks mounted to the left hand frame members to impart said transverse movement to the left hand frame upon rotation of the side screws, wherein said chords are pre-grooved and moved along the conveyor means with their grooved surface facing upwardly, wherein the cam type flange feeder associated with the near chute associated with one side of the machine closer to the conveyor means has a first arcuate cam surface and a larger second arcuate cam surface separated from each other by a radially extending said pushing surface, said first surface being normally disposed below a slide ramp along which the chords move from the conveying means to the inlet of the near chute, wherein the upper end of the hold-down associated with the near chute and the first surface of said cam define the inlet which is a gap smaller than the height of the chord to normally prevent the chord from entering the near chute; and wherein the far chute located on the farther side of the machine to which the chords are conveyed to the chute along a ramp extending in part above and over the near chute includes a second hold-down pivotally mounted to move between a raised position and a lower position and a second cam type flange feeder mounted downstream from and in spaced relation to the second hold-down to define therewith the inlet to the far chute, wherein in the lower position the second hold-down is disposed below the ramp to enable the chords to slide thereover onto an accumulating surface of the second cam which accumulating surface terminates in the pushing surface of the second cam and in the raised position of said second hold-down the flow of chords along the ram towards the accumulating surface is disrupted by the hold-down, said second hold-down in the raised position having an upper end defining the inlet to the far chute together with the accumulating surface of the cam which inlet is a gap less than the height of the chords to normally prevent the chords from entering the far chute, whereby timed rotation of the second cam in a counter-rotating direction relative to the first cam causes the pushing surface of the second cam to direct the chords on the accumulating surface into the far chute with the groove surfaces facing inwardly.

21. A chords and webs assembly machine including a machine frame for manufacturing a wooden I-beam from a pair of elongated wooden chord members each having a longitudinal groove formed in one of the faces of the chord and planar wooden web members having opposite longitudinal edges, comprising:

(a) a web conveyor arrangement connected to the frame for conveying said web members in end-to-end relationship as a continuous web;

(b) a guiding arrangement connected to the frame for guiding a pair of said chords respectively along opposite sides of the continuous web with longitudinal grooves of said chords facing said web;

(c) a directing arrangement connected to the frame for directing said pair of chords towards said continuous web so that opposite sides of said web are respectively inserted into the grooves of said chords to form an interconnecting joint therebetween and thereby said wooden I-beam; and (d) a beam driving arrangement connected to the frame for driving said wooden I-beam out of said assembly machine to effect cutting of the I-beam into a desired length, wherein said assembly machine includes a pair of left and right hand frames, each left and right hand frame includes a pair of longitudinally extending frame members connected together at opposite ends thereof, and a plurality of longitudinally spaced immovable bases for supporting the left and right hand frames and thereby the assembly machine, and means for adjustably supporting the left hand frame on the immovable bases to enable lateral sliding adjustment of the left hand frame towards and away from the right hand frame to correspondingly displace the flange drive and hold-down members and thereby the left hand flanges relative to the right hand flanges to accommodate manufacture of I-beams of different height, said adjusting means including a series of side screws and slide shafts mounted on the immovable bases in the transverse direction and threaded driven blocks mounted to the left hand frame members to impart said transverse movement to the left hand frame upon rotation of the side screws.

* * * * *